US009881635B2

(12) United States Patent
Muesch

(10) Patent No.: US 9,881,635 B2
(45) **Date of Patent: *Jan. 30, 2018**

(54) METHOD AND SYSTEM FOR SCALING DUCKING OF SPEECH-RELEVANT CHANNELS IN MULTI-CHANNEL AUDIO

(71) Applicant: Dolby Laboratories Licensing Corporation, San Francisco, CA (US)

(72) Inventor: Hannes Muesch, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/942,706

(22) Filed: Nov. 16, 2015

(65) Prior Publication Data

US 2016/0071527 A1 Mar. 10, 2016

Related U.S. Application Data

(63) Continuation of application No. 13/583,204, filed as application No. PCT/US2011/026505 on Feb. 28, 2011.

(Continued)

(51) Int. Cl.
*G10L 21/00* (2013.01)
*G10L 21/02* (2013.01)
(Continued)

(52) U.S. Cl.
CPC ...... *G10L 21/0364* (2013.01); *G10L 21/0208* (2013.01); *G10L 21/034* (2013.01);
(Continued)

(58) Field of Classification Search
CPC ..... G10L 21/0208; G10L 13/07; G10L 25/93; G10L 15/20; G10L 19/12; G10L 19/005;
(Continued)

(56) References Cited

U.S. PATENT DOCUMENTS 5,666,429 A * 9/1997 Urbanski ............... H03G 9/005 381/94.1
5,920,834 A * 7/1999 Sih ........................... H04B 3/23 379/406.06

(Continued)

FOREIGN PATENT DOCUMENTS

CN 1571584 1/2005
DE 102007048973 4/2009

(Continued)

OTHER PUBLICATIONS

ANSI/ASA S3-5 "Methods for Calculation of the Speech Intelligibility Index" 1997.

(Continued)

*Primary Examiner* — Anne T Thomas-Homescu

(57) ABSTRACT

A method and system for filtering a multi-channel audio signal having a speech channel and at least one non-speech channel, to improve intelligibility of speech determined by the signal. In typical embodiments, the method includes steps of determining at least one attenuation control value indicative of a measure of similarity between speech-related content determined by the speech channel and speech-related content determined by the non-speech channel, and attenuating the non-speech channel in response to the at least one attenuation control value. Typically, the attenuating step includes scaling of a raw attenuation control signal (e.g., a ducking gain control signal) for the non-speech channel in response to the at least one attenuation control value. Some embodiments are a general or special purpose processor programmed with software or firmware and/or otherwise configured to perform filtering in accordance the invention.

19 Claims, 6 Drawing Sheets

Related U.S. Application Data

(60) Provisional application No. 61/311,437, filed on Mar. 8, 2010.

(51) Int. Cl.

| | |
|---|---|
| ***G10L 15/00*** | (2013.01) |
| ***G10L 13/00*** | (2006.01) |
| ***G10L 19/00*** | (2013.01) |
| ***H04B 15/00*** | (2006.01) |
| ***H04R 5/02*** | (2006.01) |
| ***G10L 21/0364*** | (2013.01) |
| ***G10L 21/0208*** | (2013.01) |
| ***H04S 7/00*** | (2006.01) |
| ***G10L 21/034*** | (2013.01) |
| *G10L 21/0232* | (2013.01) |
| *H04S 3/00* | (2006.01) |

(52) U.S. Cl.
CPC ............ *H04S 7/30* (2013.01); *G10L 21/0232* (2013.01); *H04S 3/008* (2013.01); *H04S 2400/09* (2013.01); *H04S 2400/13* (2013.01)

(58) Field of Classification Search
CPC ................ G10L 25/90; G10K 11/1788; G10K 2210/1081; G10K 11/175; H05K 999/99; H04B 1/665; H04S 1/002; H04S 3/02; H04R 27/00; H04R 3/005; H04M 9/082; H04H 60/04; H03G 3/04; H03G 3/348
See application file for complete search history.

(56) References Cited

U.S. PATENT DOCUMENTS

| | | | | | |
|---|---|---|---|---|---|
| 5,983,183 | A * | 11/1999 | Tabet | H03G 3/3089 | 381/108 |
| 6,226,321 | B1 * | 5/2001 | Michels | G01S 7/292 | 375/227 |
| 6,442,278 | B1 * | 8/2002 | Vaudrey | H04R 3/005 | 381/104 |
| 6,778,954 | B1 * | 8/2004 | Kim | G10L 21/0208 | 704/226 |
| 7,110,550 | B2 | 9/2006 | Motojima | | |
| 8,577,676 | B2 | 11/2013 | Muesch | | |
| 8,615,393 | B2 * | 12/2013 | Tashev | G10L 15/065 | 704/226 |
| 2002/0002455 | A1 * | 1/2002 | Accardi | G10L 21/0208 | 704/226 |
| 2002/0159434 | A1 * | 10/2002 | Gosior | H04L 1/1685 | 370/350 |
| 2003/0044032 | A1 * | 3/2003 | Irwan | H04S 3/00 | 381/307 |
| 2003/0055636 | A1 * | 3/2003 | Katuo | G10L 21/0364 | 704/225 |
| 2003/0117728 | A1 * | 6/2003 | Hutzel | B60Q 3/023 | 359/838 |
| 2004/0049383 | A1 * | 3/2004 | Kato | G10L 21/0208 | 704/226 |
| 2004/0096065 | A1 * | 5/2004 | Vaudrey | H04R 3/005 | 381/22 |
| 2004/0148166 | A1 * | 7/2004 | Zheng | G10L 21/0208 | 704/233 |
| 2006/0200347 | A1 * | 9/2006 | Kim | G10L 15/22 | 704/236 |
| 2006/0271362 | A1 * | 11/2006 | Katou | G10L 21/0208 | 704/233 |
| 2007/0058822 | A1 * | 3/2007 | Ozawa | G10L 21/0208 | 381/94.1 |
| 2007/0100605 | A1 * | 5/2007 | Renevey | G10L 21/0272 | 704/201 |
| 2007/0136056 | A1 * | 6/2007 | Moogi | G10L 21/0208 | 704/227 |
| 2007/0233479 | A1 * | 10/2007 | Burnett | G10L 25/93 | 704/233 |
| 2007/0239295 | A1 * | 10/2007 | Thompson | G10L 19/008 | 700/94 |
| 2008/0019537 | A1 * | 1/2008 | Nongpiur | G10L 21/0364 | 381/71.7 |
| 2008/0140396 | A1 * | 6/2008 | Grosse-Schulte | G10L 15/20 | 704/227 |
| 2008/0165975 | A1 * | 7/2008 | Oh | G10L 19/008 | 381/17 |
| 2008/0167864 | A1 | 7/2008 | Faller | | |
| 2008/0219471 | A1 * | 9/2008 | Sugiyama | G10L 21/0208 | 381/94.2 |
| 2009/0129610 | A1 * | 5/2009 | Kim | G10K 11/178 | 381/94.7 |
| 2009/0196434 | A1 * | 8/2009 | Sugiyama | G10L 21/0208 | 381/94.2 |
| 2009/0299739 | A1 * | 12/2009 | Chan | H04R 3/005 | 704/225 |
| 2010/0121634 | A1 * | 5/2010 | Muesch | G10L 21/0205 | 704/224 |
| 2011/0010168 | A1 * | 1/2011 | Yu | G10L 19/093 | 704/219 |
| 2011/0066428 | A1 * | 3/2011 | Yang | G10L 21/0208 | 704/225 |
| 2011/0099596 | A1 * | 4/2011 | Ure | H04N 7/17318 | 725/106 |
| 2011/0119061 | A1 * | 5/2011 | Brown | G10L 19/008 | 704/258 |
| 2011/0164770 | A1 * | 7/2011 | Lindahl | H04S 5/00 | 381/311 |
| 2012/0321095 | A1 * | 12/2012 | Hetherington | 381/56 | |

FOREIGN PATENT DOCUMENTS

| | | | |
|---|---|---|---|
| JP | H08-222979 | 8/1996 | |
| JP | 2003-274492 | 9/2003 | |
| RU | 2151430 | 6/2000 | |
| WO | 03/022003 | 3/2003 | |
| WO | 2008/073487 | 6/2008 | |
| WO | WO 2008106036 A2 * | 9/2008 | G10L 21/0205 |
| WO | 2010003068 | 1/2010 | |

OTHER PUBLICATIONS

Li, Z. et al., "Robust Speech Coding Using Microphone Arrays" Signals, Systems and Computers, Conference Record of the Thirty First Asilomar Conference on Pacific Grove, CA, Nov. 2-5, 1997, vol. 1, pp. 44-48.

Musch, H. et al. "Using Statistical Decision Theory to Predict Speech Intelligibility I. Model Structure" Journal of the Acoustical Society of America, 2001, vol. 109 pp. 2896-2909.

Rosca J. et al., "Multi-Channel Psychoacoustically Motivated Speech Enhancement" Proceedings of the 2003 International Conference on Multimedia and Expo: Jul. 6-9, 2003, Baltimore Marriott Waterfront, Maryland, USA, IEEE Operations Center, vol. 3, pp. 217-220.

Vinton, M. et al., "Automated Speech/Other Discrimination for Loudness Monitoring" AES Convention Paper 6437, presented at the 118th Convention May 28-31, 2005, Barcelona Spain.

List of references cited by the examiner in Notice of Allowance issued for U.S. Appl. No. 13/583,204 dated Aug. 28, 2015 and in the USPTO Office Action for U.S. Appl. No. 13/583,204 dated Mar. 11, 2015.

* cited by examiner

METHOD AND SYSTEM FOR SCALING DUCKING OF SPEECH-RELEVANT CHANNELS IN MULTI-CHANNEL AUDIO

CROSS-REFERENCE TO RELATED APPLICATIONS

This application is a continuation of U.S. patent application Ser. No. 13/583,204 filed Sep. 6, 2012, which is a national-stage entry of International Patent application no. PCT/US2011/026505 filed Feb. 28, 2011, which claims priority to U.S. Patent Provisional Application No. 61/311,437, filed 8 Mar. 2010, all of which are hereby incorporated by reference.

BACKGROUND OF THE INVENTION

1. Field of the Invention

The invention relates to systems and methods for improving intelligibility of human speech (e.g., dialog) determined by a multi-channel audio signal. In some embodiments, the invention is a method and system for filtering an audio signal having a speech channel and a non-speech channel to improve intelligibility of speech determined by the signal, by determining at least one attenuation control value indicative of a measure of similarity between speech-related content determined by the speech channel and speech-related content determined by the non-speech channel, and attenuating the non-speech channel in response to the attenuation control value.

2. Background of the Invention

Throughout this disclosure including in the claims, the term “speech” is used in a broad sense to denote human speech. Thus, “speech” determined by an audio signal is audio content of the signal that is perceived as human speech (e.g., dialog, monologue, singing, or other human speech) upon reproduction of the signal by a loudspeaker (or other sound-emitting transducer). In accordance with typical embodiments of the invention, the audibility of speech determined by an audio signal is improved relative to other audio content (e.g., instrumental music or non-speech sound effects) determined by the signal, thereby improving the intelligibility (e.g., clarity or ease of understanding) of the speech.

Throughout this disclosure including in the claims, the expression “speech-enhancing content” of a channel of a multi-channel audio signal is content (determined by the channel) that enhances the intelligibility or other perceived quality of speech content determined by another channel (e.g., a speech channel) of the signal.

Typical embodiments of the invention assume that the majority of speech determined by a multi-channel input audio signal is determined by the signal’s center channel. This assumption is consistent with the convention in surround sound production according to which the majority of speech is usually placed into only one channel (the Center channel), and the majority of music, ambient sound, and sound effects is usually mixed into all the channels (e.g., the Left, Right, Left Surround and Right Surround channels as well as the Center channel).

Thus, the center channel of a multi-channel audio signal will sometimes be referred to herein as the “speech” channel and all other channels (e.g., Left, Right, Left Surround, and Right Surround) channels of the signal will sometimes be referred to herein as “non-speech” channels. Similarly, a “center” channel generated by summing the left and right channels of a stereo signal whose speech is center panned will sometimes be referred to herein as a “speech” channel, and a “side” channel generated by subtracting such a center channel from the stereo signal’s left (or right) channel will sometimes be referred to herein as a “non-speech” channel.

Throughout this disclosure including in the claims, the expression performing an operation “on” signals or data (e.g., filtering, scaling, or transforming the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression “system” is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout the disclosure including in the claims, the expression “ratio” of a first value (“A”) to a second value (“B”) is used in a broad sense to denote A/B, or B/A, or a ratio of a scaled or offset version one of A and B to a scaled or offset version of the other one of A and B (e.g., (A+x)/(B+y), where x and y are offset values).

Throughout the disclosure including in the claims, the expression “reproduction” of signals by sound-emitting transducers (e.g., speakers) denotes causing the transducers to produce sound in response to the signals, including by performing any required amplification and/or other processing of the signals.

When speech is heard in the presence of competing sounds (such as listening to a friend over the noise of a crowd in a restaurant), a portion of the acoustic features that signal the phonemic content of the speech (speech cues) are masked by the competing sounds and are no longer available to the listener to decode the message. As the level of the competing sound increases relative to the level of the speech, the number of speech cues that are received correctly diminishes and speech perception becomes progressively more cumbersome until, at some level of competing sound, the speech perception process breaks down. While this relation holds true for all listeners, the level of competing sound that can be tolerated for any speech level is not the same for all listeners. Some listeners, e.g., those with hearing loss due to aging (presbyacusis) or those listening to a language that they acquired after puberty, are less capable of tolerating competing sounds than are listeners with good hearing or those operating in their native language.

The fact that listeners differ in their ability to understand speech in the presence of competing sounds has implications for the level at which ambient sounds and background music in news or entertainment audio are mixed with speech. Listeners with hearing loss or those operating in a foreign language often prefer a lower relative level of non speech audio than that provided by the content creator.

To accommodate these special needs, it is known to apply attenuation (ducking) to non-speech channels of a multi-channel audio signal, but less (or no) attenuation to the signal’s speech channel, to improve intelligibility of speech determined by the signal.

For example, PCT International Application Publication Number WO 2010/011377, naming Hannes Muesch as inventor and assigned to Dolby Laboratories Licensing Corporation (published Jan. 28, 2010), discloses that non-speech channels (e.g., left and right channels) of a multi-channel audio signal may mask speech in the signal's speech channel (e.g., center channel) to the point that a desired level of speech intelligibility is no longer met. WO 2010/011377 describes how to determine an attenuation function to be applied by ducking circuitry to the non-speech channels in an attempt to unmask the speech in the speech channel while preserving as much of the content creator's intent as possible. The technique described in WO 2010/011377 is based on the assumption that content in a non-speech channel never enhances the intelligibility (or other perceived quality) of speech content determined by the speech channel.

The present invention is based in part on the recognition that, while this assumption is correct for the vast majority of multi-channel audio content, it is not always valid. The inventor has recognized that when at least one non-speech channel of a multi-channel audio signal does include content that enhances the intelligibility (or other perceived quality) of speech content determined by the signal's speech channel, filtering of the signal in accordance with the method of WO 2010/011377 can negatively affect the entertainment experience of one listening to the reproduced filtered signal. In accordance with typical embodiments of the present invention, application of the method described in WO 2010/011377 is suspended or modified during times when content does not conform to the assumptions underlying the method of WO 2010/011377.

There is a need for a method and system for filtering a multi-channel audio signal to improve speech intelligibility in the common case that at least one non-speech channel of the audio signal includes content that enhances the intelligibility of speech content in the audio signal's speech channel.

BRIEF DESCRIPTION OF THE INVENTION

In a first class of embodiments, the invention is a method for filtering a multi-channel audio signal having a speech channel and at least one non-speech channel, to improve intelligibility of speech determined by the signal. The method includes steps of: (a) determining at least one attenuation control value indicative of a measure of similarity between speech-related content determined by the speech channel and speech-related content determined by at least one non-speech channel of the multi-channel audio signal; and (b) attenuating at least one non-speech channel of the multi-channel audio signal in response to the at least one attenuation control value. Typically, the attenuating step comprises scaling a raw attenuation control signal (e.g., a ducking gain control signal) for the non-speech channel in response to the at least one attenuation control value. Preferably, the non-speech channel is attenuated so as to improve intelligibility of speech determined by the speech channel without undesirably attenuating speech-enhancing content determined by the non-speech channel. In some embodiments, each attenuation control value determined in step (a) is indicative of a measure of similarity between speech-related content determined by the speech channel and speech-related content determined by one non-speech channel of the audio signal, and step (b) includes the step of attenuating this non-speech channel in response to said each attenuation control value. In some other embodiments, step (a) includes a step of deriving a derived non-speech channel from at least one non-speech channel of the audio signal, and the at least one attenuation control value is indicative of a measure of similarity between speech-related content determined by the speech channel and speech-related content determined by the derived non-speech channel. For example, the derived non-speech channel can be generated by summing or otherwise mixing or combining at least two non-speech channels of the audio signal. Determining each attenuation control value from a single derived non-speech channel can reduce the cost and complexity of implementing some embodiments of the invention, relative to the cost and complexity of determining different subsets of a set of attenuation values from different non-speech channels. In embodiments in which the input audio signal has at least two non-speech channels, step (b) can include the step of attenuating a subset of the non-speech channels (e.g., each non-speech channel from which a derived non-speech channel has been derived), or all of the non-speech channels, in response to the at least one attenuation control value (e.g., in response to a single sequence of attenuation control values).

In some embodiments in the first class, step (a) includes a step of generating an attenuation control signal indicative of a sequence of attenuation control values, each of the attenuation control values indicative of a measure of similarity between speech-related content determined by the speech channel and speech-related content determined by the at least one non-speech channel at a different time (e.g., in a different time interval), and step (b) includes steps of: scaling a ducking gain control signal in response to the attenuation control signal to generate a scaled gain control signal, and applying the scaled gain control signal to attenuate the at least one non-speech channel (e.g., asserting the scaled gain control signal to ducking circuitry to control attenuation of the at least one non-speech channel by the ducking circuitry). For example, in some such embodiments, step (a) includes a step of comparing a first speech-related feature sequence (indicative of the speech-related content determined by the speech channel) to a second speech-related feature sequence (indicative of the speech-related content determined by the at least one non-speech channel) to generate the attenuation control signal, and each of the attenuation control values indicated by the attenuation control signal is indicative of a measure of similarity between the first speech-related feature sequence and the second speech-related feature sequence at a different time (e.g., in a different time interval). In some embodiments, each attenuation control value is a gain control value.

In some embodiments in the first class, each attenuation control value is monotonically related to likelihood that at least one non-speech channel of the audio signal is indicative of speech-enhancing content that enhances the intelligibility (or another perceived quality) of speech content determined by the speech channel. In some other embodiments in the first class, each attenuation control value is monotonically related to an expected speech-enhancing value of the at least one non-speech channel (e.g., a measure of probability that the at least one non-speech channel is indicative of speech-enhancing content, multiplied by a measure of perceived quality enhancement that speech-enhancing content determined by the at least one non-speech channel would provide to speech content determined by the multi-channel signal). For example, where step (a) includes a step of comparing a first speech-related feature sequence indicative of speech-related content determined by the speech channel to a second speech-related feature sequence indicative of speech-related content determined by the at least one non-speech channel, the first speech-related feature sequence may be a sequence of speech likelihood values, each indicating the likelihood at a different time (e.g., in a different time interval) that the speech channel is indicative of speech (rather than audio content other than speech), and the second speech-related feature sequence may also be a sequence of speech likelihood values, each indicating the likelihood at a different time (e.g., in a different time interval) that the at least one non-speech channel is indicative of speech. Various methods of automatically generating such sequences of speech likelihood values from an audio signal are known. For example, one such method is described by Robinson and Vinton in "Automated Speech/Other Discrimination for Loudness Monitoring" (Audio Engineering Society, Preprint number 6437 of Convention 118, May 2005). Alternatively, it is contemplated that the sequences of speech likelihood values could be created manually (e.g., by the content creator) and transmitted alongside the multi-channel audio signal to the end user.

In a second class of embodiments, in which the multi-channel audio signal has a speech channel and at least two non-speech channels including a first non-speech channel and a second non-speech channel, the inventive method includes steps of: (a) determining at least one first attenuation control value indicative of a measure of similarity between speech-related content determined by the speech channel and second speech-related content determined by the first non-speech channel (e.g., including by comparing a first speech-related feature sequence indicative of speech-related content determined by the speech channel to a second speech-related feature sequence indicative of the second speech-related content); and (b) determining at least one second attenuation control value indicative of a measure of similarity between speech-related content determined by the speech channel and third speech-related content determined by the second non-speech channel (e.g., including by comparing a third speech-related feature sequence indicative of speech-related content determined by the speech channel to a fourth speech-related feature sequence indicative of the third speech-related content, where the third speech-related feature sequence may be identical to the first speech-related feature sequence of step (a)). Typically, the method includes the step of attenuating the first non-speech channel (e.g., scaling attenuation of the first non-speech channel) in response to the at least one first attenuation control value and attenuating the second non-speech channel (e.g., scaling attenuation of the second non-speech channel) in response to the at least one second attenuation control value. Preferably, each non-speech channel is attenuated so as to improve intelligibility of speech determined by the speech channel without undesirably attenuating speech-enhancing content determined by either non-speech channel.

In some embodiments in the second class:

the at least one first attenuation control value determined in step (a) is a sequence of attenuation control values, and each of the attenuation control values is a gain control value for scaling the amount of gain applied to the first non-speech channel by ducking circuitry so as to improve intelligibility of speech determined by the speech channel without undesirably attenuating speech-enhancing content determined by the first non-speech channel; and the at least one second attenuation control value determined in step (b) is a sequence of second attenuation control values, and each of the second attenuation control values is a gain control value for scaling the amount of gain applied to the second non-speech channel by ducking circuitry so as to improve intelligibility of speech determined by the speech channel without undesirably attenuating speech-enhancing content determined by the second non-speech channel.

In a third class of embodiments, the invention is a method for filtering a multi-channel audio signal having a speech channel and at least one non-speech channel, to improve intelligibility of speech determined by the signal. The method includes steps of: (a) comparing a characteristic of the speech channel and a characteristic of the non-speech channel to generate at least one attenuation value for controlling attenuation of the non-speech channel relative to the speech channel; and (b) adjusting the at least one attenuation value in response to at least one speech enhancement likelihood value to generate at least one adjusted attenuation value for controlling attenuation of the non-speech channel relative to the speech channel. Typically, the adjusting step is (or includes) scaling each said attenuation value in response to one said speech enhancement likelihood value to generate one said adjusted attenuation value. Typically, each speech enhancement likelihood value is indicative of (e.g., monotonically related to) a likelihood that the non-speech channel (or a non-speech channel derived from the non-speech channel or from a set of non-speech channels of the input audio signal) is indicative of speech-enhancing content (content that enhances the intelligibility or other perceived quality of speech content determined by the speech channel). In some embodiments, the speech enhancement likelihood value is indicative of an expected speech-enhancing value of the non-speech channel (e.g., a measure of probability that the non-speech channel is indicative of speech-enhancing content multiplied by a measure of perceived quality enhancement that speech-enhancing content determined by the non-speech channel would provide to speech content determined by the multi-channel audio signal). In some embodiments in the third class, the at least one speech enhancement likelihood value is a sequence of comparison values (e.g., difference values) determined by a method including a step of comparing a first speech-related feature sequence indicative of speech-related content determined by the speech channel to a second speech-related feature sequence indicative of speech-related content determined by the non-speech channel, and each of the comparison values is a measure of similarity between the first speech-related feature sequence and the second speech-related feature sequence at a different time (e.g., in a different time interval). In typical embodiments in the third class, the method also includes the step of attenuating the non-speech channel in response to the at least one adjusted attenuation value. Step (b) can comprise scaling the at least one attenuation value (which typically is, or is determined by, a ducking gain control signal or other raw attenuation control signal) in response to the at least one speech enhancement likelihood value.

In some embodiments in the third class, each attenuation value generated in step (a) is a first factor indicative of an amount of attenuation of the non-speech channel necessary to limit the ratio of signal power in the non-speech channel to the signal power in the speech channel not to exceed a predetermined threshold, scaled by a second factor monotonically related to the likelihood of the speech channel being indicative of speech. Typically, the adjusting step in these embodiments is (or includes) scaling each said attenuation value by one said speech enhancement likelihood value to generate one said adjusted attenuation value, where the speech enhancement likelihood value is a factor monotonically related to one of: a likelihood that the non-speech channel is indicative of speech-enhancing content (content that enhances the intelligibility or other perceived quality of speech content determined by the multi-channel signal), and an expected speech-enhancing value of the non-speech channel (e.g., a measure of probability that the non-speech channel is indicative of speech-enhancing content multiplied by a measure of the perceived quality enhancement that speech-enhancing content in the non-speech channel would provide to speech content determined by the multi-channel signal).

In some embodiments in the third class, each attenuation value generated in step (a) is a first factor indicative of an amount (e.g., the minimum amount) of attenuation of the non-speech channel sufficient to cause predicted intelligibility of speech determined by the speech channel in the presence of content determined by the non-speech channel to exceed a predetermined threshold value, scaled by a second factor monotonically related to the likelihood of the speech channel being indicative of speech. Preferably, the predicted intelligibility of speech determined by the speech channel in the presence of content determined by the non-speech channel is determined in accordance with a psychoacoustically based intelligibility prediction model. Typically, the adjusting step in these embodiments is (or includes) scaling each said attenuation value by one said speech enhancement likelihood value to generate one said adjusted attenuation value, where the speech enhancement likelihood value is a factor monotonically related to one of: a likelihood that the non-speech channel is indicative of speech-enhancing content, and an expected speech-enhancing value of the non-speech channel.

In some embodiments in the third class, step (a) includes the steps of generating each said attenuation value including by determining a power spectrum (indicative of power as a function of frequency) of each of the speech channel and the non-speech channel, and performing a frequency-domain determination of the attenuation value in response to each said power spectrum. Preferably, the attenuation values generated in this way determine attenuation as a function of frequency to be applied to frequency components of the non-speech channel.

In a class of embodiments, the invention is a method and system for enhancing speech determined by a multi-channel audio input signal. In some embodiments, the inventive system includes an analysis module (subsystem) configured to analyze the input multi-channel signal to generate attenuation control values, and an attenuation subsystem. The attenuation subsystem is configured to apply ducking attenuation, steered by at least some of the attenuation control values, to each non-speech channel of the input signal to generate a filtered audio output signal. In some embodiments, the attenuation subsystem includes ducking circuitry (steered by at least some of the attenuation control values) coupled and configured to apply attenuation (ducking) to each non-speech channel of the input signal to generate the filtered audio output signal. The ducking circuitry is steered by control values in the sense that the attenuation it applies to the non-speech channels is determined by current values of the control values.

In typical embodiments, the inventive system is or includes a general or special purpose processor programmed with software (or firmware) and/or otherwise configured to perform an embodiment of the inventive method. In some embodiments, the inventive system is a general purpose processor, coupled to receive input data indicative of the audio input signal and programmed (with appropriate software) to generate output data indicative of the audio output signal in response to the input data by performing an embodiment of the inventive method. In other embodiments, the inventive system is implemented by appropriately configuring (e.g., by programming) a configurable audio digital signal processor (DSP). The audio DSP can be a conventional audio DSP that is configurable (e.g., programmable by appropriate software or firmware, or otherwise configurable in response to control data) to perform any of a variety of operations on input audio. In operation, an audio DSP that has been configured to perform active speech enhancement in accordance with the invention is coupled to receive the audio input signal, and the DSP typically performs a variety of operations on the input audio in addition to (as well as) speech enhancement. In accordance with various embodiments of the invention, an audio DSP is operable to perform an embodiment of the inventive method after being configured (e.g., programmed) to generate an output audio signal in response to the input audio signal by performing the method on the input audio signal.

Aspects of the invention include a system configured (e.g., programmed) to perform any embodiment of the inventive method, and a computer readable medium (e.g., a disc) which stores code for implementing any embodiment of the inventive method.

DETAILED DESCRIPTION OF THE PREFERRED EMBODIMENTS

Figure 1A:
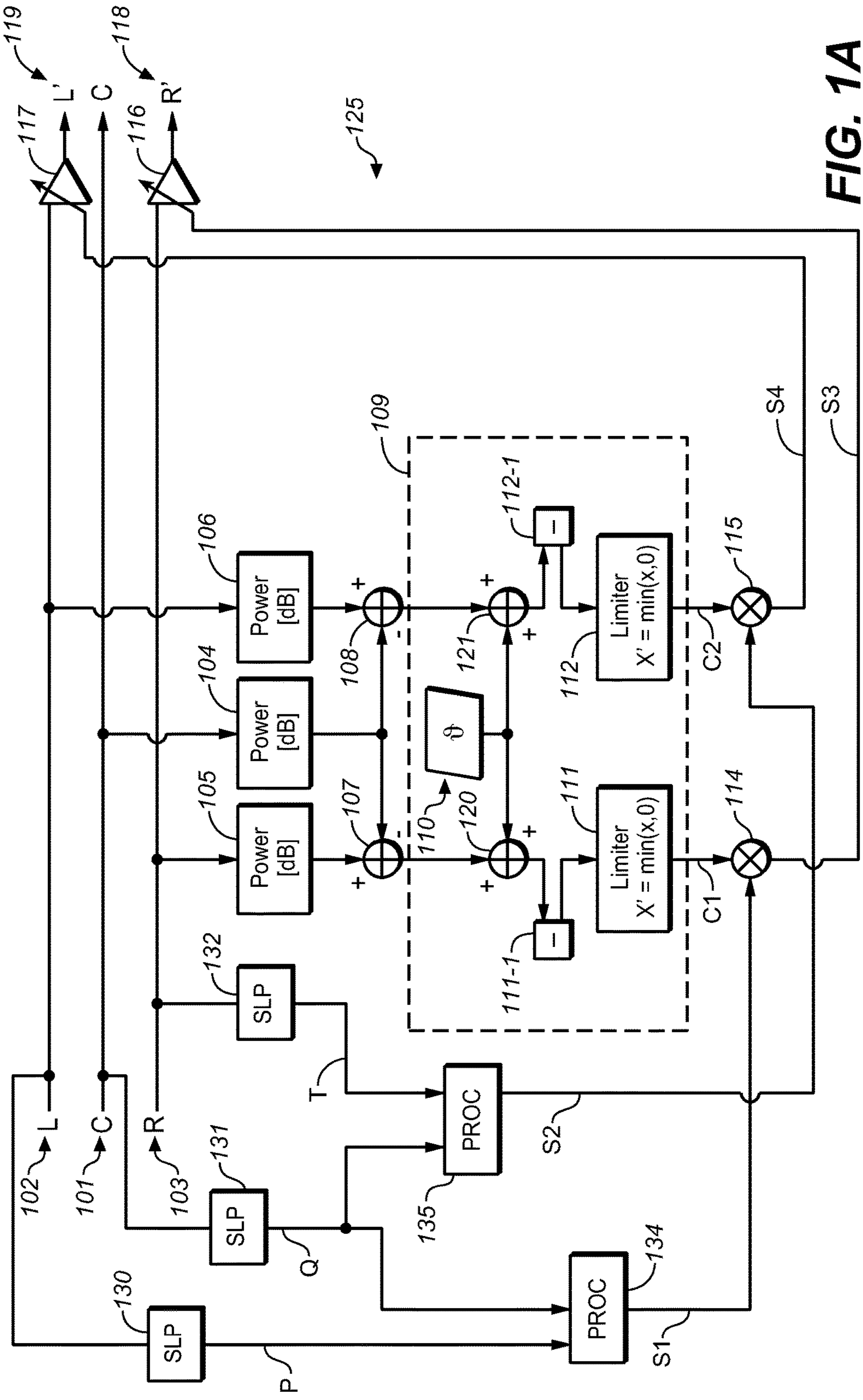
FIG. 1A is a block diagram of an embodiment of the inventive system.

Many embodiments of the present invention are technologically possible. It will be apparent to those of ordinary skill in the art from the present disclosure how to implement them. Embodiments of the inventive system, method, and medium will be described with reference to FIGS. 1A, 1B, 2A, 2B, and 3-5.

The inventor has observed that some multi-channel audio content has different, yet related speech content in the speech channel and at least one non-speech channel. For example, multi-channel audio recordings of some stage shows are mixed such that "dry" speech (i.e., speech without noticeable reverberation) is placed into the speech channel (typically, the center channel, C, of the signal) and the same speech, but with a significant reverberation component ("wet" speech) is placed in the non-speech channels of the signal. In a typical scenario, the dry speech is the signal from the microphone that the stage performer holds close to his mouth and the wet speech is the signal from microphones placed in the audience. The wet speech is related to the dry speech since it is the performance as heard by the audience in the venue. Yet it differs from the dry speech. Typically the wet speech is delayed relative to the dry speech, and has a different spectrum and different additive components (e.g., audience noises and reverberation).

Depending on the relative levels of dry and wet speech, it is possible that the wet speech component masks the dry speech component to a degree that attenuation of non-speech channels in ducking circuitry (e.g., as in the method described in above-cited WO 2010/011377) undesirably attenuates the wet speech signal. Although the dry and wet speech components can be described as separate entities, a listener perceptually fuses the two and hears them as a single stream of speech. Attenuating the wet speech component (e.g., in ducking circuitry) may have the effect of lowering the perceived loudness of the fused speech stream along with collapsing its image width. The inventor has recognized that for multi-channel audio signals having wet and dry speech components of the noted type, it would often be more perceptually pleasing as well as more conducive to speech intelligibility if the level of the wet speech components were not altered during speech enhancement processing of the signals.

The invention is based in part on the recognition that, when at least one non-speech channel of a multi-channel audio signal includes content that enhances the intelligibility (or other perceived quality) of speech content determined by the signal's speech channel, filtering the signal's non-speech channels using ducking circuitry (e.g., in accordance with the method of WO 2010/011377) can negatively affect the entertainment experience of one listening to the reproduced filtered signal. In accordance with typical embodiments of the invention, attenuation (in ducking circuitry) of at least one non-speech channel of a multi-channel audio signal is suspended or modified during times when the non-speech channel includes speech-enhancing content (content that enhances the intelligibility or other perceived quality of speech content determined by the signal's speech channel). At times when the non-speech channel does not include speech-enhancing content (or does not include speech-enhancing content that meets a predetermined criterion), the non-speech channel is attenuated normally (the attenuation is not suspended or modified).

A typical multi-channel signal (having a speech channel) for which conventional filtering in ducking circuitry is inappropriate is one including at least one non-speech channel that carries speech cues that are substantially identical to speech cues in the speech channel. In accordance with typical embodiments of the present invention, a sequence of speech related features in the speech channel is compared to a sequence of speech related features in the non-speech channel. A substantial similarity of the two feature sequences indicates that the non-speech channel (i.e., the signal in the non-speech channel) contributes information useful for understanding the speech in the speech channel and that attenuation of the non-speech channel should be avoided.

To appreciate the significance of examining the similarity between such speech related feature sequences rather than the signals themselves, it is important to recognize that "dry" and "wet" speech content (determined by speech and non-speech channels) is not identical; the signals indicative of the two types of speech content are typically temporally offset, and have undergone different filtering processes and have had different extraneous components added. Therefore, a direct comparison between the two signals will yield a low similarity, regardless of whether the non-speech channel contributes speech cues that are the same as the speech channel (as in the case of dry and wet speech), unrelated speech cues (as in the case of two unrelated voices in the speech and non-speech channel [e.g., a target conversation in the speech channel and background babble in the non-speech channel]), or no speech cues at all (e.g., the non-speech channel carries music and effects). By basing the comparison on speech features (as in preferred embodiments of the present invention), a level of abstraction is achieved that lessens the impact of irrelevant signal aspects, such as small amounts of delay, spectral differences, and extraneous added signals. Thus, preferred implementations of the invention typically generate at least two streams of speech features: one representing the signal in the speech channel; and at least one representing the signal a non-speech channel.

A first embodiment (125) of the inventive system will be described with reference to FIG. 1A. In response to a multi-channel audio signal comprising a speech channel 101 (center channel C) and two non-speech channels 102 and 103 (left and right channels L and R), the FIG. 1A system filters the non-speech channels to generate a filtered multi-channel output audio signal comprising speech channel 101 and filtered non-speech channels 118 and 119 (filtered left and right channels L' and R'). Alternatively, one or both of non-speech channels 102 and 103 can be another type of non-speech channel of a multi-channel audio signal (e.g., left-rear and/or right-rear channels of a 5.1 channel audio signal) or can be a derived non-speech channel that is derived from (e.g., is a combination of) any of many different subsets of non-speech channels of a multi-channel audio signal. Alternatively, embodiments of the inventive system can be implemented to filter only one non-speech channel, or more than two non-speech channels, of a multi-channel audio signal.

With reference again to FIG. 1A, non-speech channels 102 and 103 are asserted to ducking amplifiers 117 and 116, respectively. In operation, ducking amplifier 116 is steered by a control signal S3 (which is indicative of a sequence of control values, and is thus also referred to as control value sequence S3) output from multiplication element 114, and ducking amplifier 117 is steered by control signal S4 (which is indicative of a sequence of control values, and is thus also referred to as control value sequence S4) output from multiplication element 115.

The power of each channel of the multi-channel input signal is measured with a bank of power estimators (104, 105, and 106) and expressed on a logarithmic scale [dB]. These power estimators may implement a smoothing mechanism, such as a leaky integrator, so that the measured power level reflects the power level averaged over the duration of a sentence or an entire passage. The power level of the signal in the speech channel is subtracted from the power level in each of the non-speech channels (by subtraction elements 107 and 108) to give a measure of the ratio of power between the two signal types. The output of element 107 is a measure of the ratio of power in non-speech channel 103 to power in speech channel 101. The output of element 108 is a measure of the ratio of power in non-speech channel 102 to power in speech channel 101.

Comparison circuit 109 determines for each non-speech channel the number of decibels (dB) by which the non-speech channel must be attenuated in order for its power level to remain at least $\vartheta$ dB below the power level of the signal in the speech channel (where the symbol "$\vartheta$," also known as script theta, denotes a predetermined threshold value). In one implementation of circuit 109, addition element 120 adds the threshold value $\vartheta$ (stored in element 110, which may be a register) to the power level difference (or "margin") between non-speech channel 103 and speech channel 101, and addition element 121 adds the threshold value $\vartheta$ to the power level difference between non-speech channel 102 and speech channel 101. Elements 111-1 and 112-1 change the sign of the output of addition elements 120 and 121, respectively. This sign change operation converts attenuation values into gain values. Elements 111 and 112 limit each result to be equal to or less than zero (the output of element 111-1 is asserted to limiter 111 and the output of element 112-1 is asserted to limiter 112). The current value C1 output from limiter 111 determines the gain (negated attenuation) in dB that must be applied to non-speech channel 103 to keep its power level $\vartheta$ dB below the power level of speech channel 101 (at the relevant time, or in the relevant time window, of the multi-channel input signal). The current value C2 output from limiter 112 determines the gain (negated attenuation) in dB that must be applied to non-speech channel 102 to keep its power level $\vartheta$ dB below the power level of the speech channel 101 (at the relevant time, or in the relevant time window, of the multi-channel input signal). A typical suitable value fort $\vartheta$ is 15 dB.

Because there is a unique relation between a measure expressed on a logarithmic scale (dB) and that same measure expressed on a linear scale, a circuit (or programmed or otherwise configured processor) that is equivalent to elements 104, 105, 106, 107, 108, and 109 of FIG. 1A can be built in which power, gain, and threshold all are expressed on a linear scale. In such an implementation all level differences are replaced by ratios of the linear measures. Alternative implementations may replace the power measure with measures that are related to signal strength, such as the absolute value of the signal.

The signal C1 output from limiter 111 is a raw attenuation control signal for non-speech channel 103 (a gain control signal for ducking amplifier 116) which could be asserted directly to amplifier 116 to control ducking attenuation of non-speech channel 103. The signal C2 output from limiter 112 is a raw attenuation control signal for non-speech channel 102 (a gain control signal for ducking amplifier 117) which could be asserted directly to amplifier 117 to control ducking attenuation of non-speech channel 102.

In accordance with the invention, however, raw attenuation control signals C1 and C2 are scaled in multiplication elements 114 and 115 to generate gain control signals S3 and S4 for controlling ducking attenuation of the non-speech channels by amplifiers 116 and 117. Signal C1 is scaled in response to a sequence of attenuation control values S1, and signal C2 is scaled in response to a sequence of attenuation control values S2. Each control value S1 is asserted from the output of processing element 134 (to be described below) to an input of multiplication element 114, and signal C1 (and thus each "raw" gain control value C1 determined thereby) is asserted from limiter 111 to the other input of element 114. Element 114 scales the current value C1 in response to the current value S1 by multiplying these values together to generate the current value S3, which is asserted to amplifier 116. Each control value S2 is asserted from the output of processing element 135 (to be described below) to an input of multiplication element 115, and signal C2 (and thus each "raw" gain control value C2 determined thereby) is asserted from limiter 112 to the other input of element 115. Element 115 scales the current value C2 in response to the current value S2 by multiplying these values together to generate the current value S4, which is asserted to amplifier 117.

Control values S1 and S2 are generated in accordance with the invention as follows. In speech likelihood processing elements 130, 131, and 132, a speech likelihood signal (each of signals P, Q, and T of FIG. 1A) is generated for each channel of the multi-channel input signal. Speech likelihood signal P is indicative of a sequence of speech likelihood values for non-speech channel 102; speech likelihood signal Q is indicative of a sequence of speech likelihood values for speech channel 101, and speech likelihood signal T is indicative of a sequence of speech likelihood values for non-speech channel 103.

Speech likelihood signal Q is a value monotonically related to the likelihood that the signal in the speech channel is in fact indicative of speech. Speech likelihood signal P is a value monotonically related to the likelihood that the signal in non-speech channel 102 is speech, and speech likelihood signal T is a value monotonically related to the likelihood that the signal in non-speech channel 103 is speech. Processors 130, 131, and 132 (which are typically identical to each other, but are not identical to each other in some embodiments) can implement any of various methods for automatically determining the likelihood that the input signals asserted thereto are indicative of speech. In one embodiment, speech likelihood processors 130, 131, and 132 are identical to each other, processor 130 generates signal P (from information in non-speech channel 102) such that signal P is indicative of a sequence of speech likelihood values, each monotonically related to the likelihood that the signal in channel 102 at a different time (or time window) is speech, processor 131 generates signal Q (from information in channel 101) such that signal Q is indicative of a sequence of speech likelihood values, each monotonically related to the likelihood that the signal in channel 101 at a different time (or time window) is speech, processor 132 generates signal T (from information in non-speech channel 103) such that signal T is indicative of a sequence of speech likelihood values, each monotonically related to the likelihood that the signal in channel 102 at a different time (or time window) is speech, and each of processors 130, 131, and 132 does so by implementing (on the relevant one of channels 102, 101, and 103) the mechanism described by Robinson and Vinton in "Automated Speech/Other Discrimination for Loudness Monitoring" (Audio Engineering Society, Preprint number 6437 of Convention 118, May 2005). Alternatively, signal P may be created manually, for example by the content creator, and transmitted alongside the audio signal in channel 102 to the end user, and processor 130 may simply extract such previously created signal P from channel 102 (or processor 130 may be eliminated and the previously created signal P directly asserted to processor 134). Similarly, signal Q may be created manually and transmitted alongside the audio signal in channel 101, processor 131 may simply extract such previously created signal Q from channel 101 (or processor 131 may be eliminated and the previously created signal Q directly asserted to processors 134 and 135), signal T may be created manually and transmitted alongside the audio signal in channel 103, and processor 132 may simply extract such previously created signal T from channel 103 (or processor 132 may be eliminated and the previously created signal T directly asserted to processor 135).

In a typical implementation of processor 134, speech likelihood values determined by signals P and Q are pairwise compared to determine the difference between the current values of signals P and Q for each of a sequence of current values of signal P. In a typical implementation of processor 135, speech likelihood values determined by signals T and Q are pairwise compared to determine the difference between the current values of signals T and Q for each of a sequence of current values of signal Q. As a result, each of processors 134 and 135 generates a time sequence of difference values for a pair of speech likelihood signals.

Processors 134 and 135 are preferably implemented to smooth each such difference value sequence by time averaging, and optionally to scale each resulting averaged difference value sequence. Scaling of the averaged difference value sequences may be necessary so that the scaled averaged values output from processors 134 and 135 are in such a range that the outputs of multiplication elements 114 and 115 are useful for steering the ducking amplifiers 116 and 117.

In a typical implementation, the signal S1 output from processor 134 is a sequence of scaled averaged difference values (each of these scaled averaged difference values being a scaled average of the difference between current values of signals P and Q difference values in a different time window). The signal S1 is a ducking gain control signal for non-speech channel 102, and is employed to scale the independently generated raw ducking gain control signal C1 for non-speech channel 102. Similarly, in a typical implementation, the signal S2 output from processor 135 is a sequence of scaled averaged difference values (each of these scaled averaged difference values being a scaled average of the difference between current values of signals T and Q in a different time window). The signal S2 is a ducking gain control signal for non-speech channel 103, and is employed to scale the independently generated raw ducking gain control signal C2 for non-speech channel 103.

Scaling of raw ducking gain control signal C1 in response to ducking gain control signal S1 in accordance with the invention can be performed by multiplying (in element 114) each raw gain control value of signal C1 by a corresponding one of the scaled averaged difference values of signal S1, to generate signal S3. Scaling of raw ducking gain control signal C2 in response to ducking gain control signal S2 in accordance with the invention can be performed by multiplying (in element 115) each raw gain control value of signal C2 by a corresponding one of the scaled averaged difference values of signal S2, to generate signal S4.

Another embodiment (125') of the inventive system will be described with reference to FIG. 1B. In response to a multi-channel audio signal comprising a speech channel 101 (center channel C) and two non-speech channels 102 and 103 (left and right channels L and R), the system of FIG. 1B filters the non-speech channels to generate a filtered multichannel output audio signal comprising speech channel 101 and filtered non-speech channels 118 and 119 (filtered left and right channels L' and R').

Figure 1B:
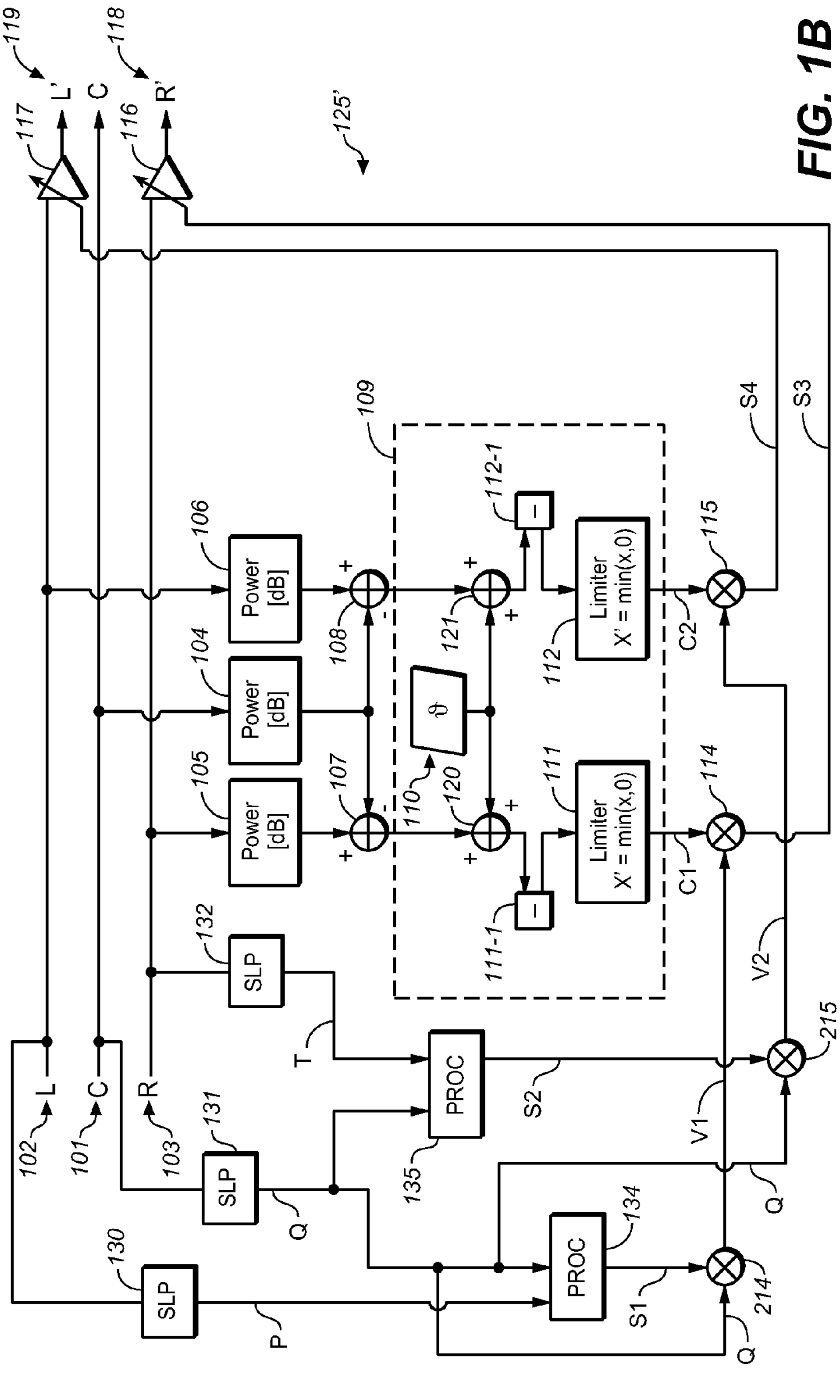
FIG. 1B is a block diagram of another embodiment of the inventive system.

In the system of FIG. 1B (as in the FIG. 1A system), non-speech channels 102 and 103 are asserted to ducking amplifiers 117 and 116, respectively. In operation, ducking amplifier 117 is steered by a control signal S4 (which is indicative of a sequence of control values, and is thus also referred to as control value sequence S4) output from multiplication element 115, and ducking amplifier 116 is steered by control signal S3 (which is indicative of a sequence of control values, and is thus also referred to as control value sequence S3) output from multiplication element 114. Elements 104, 105, 106, 107, 108, 109 (including elements 110, 120, 121, 111-1, 112-1, 111, and 112), 114, 115, 130, 131, 132, 134, and 135 of FIG. 1B are identical to (and function identically as) the identically numbered elements of FIG. 1A, and the description of them above will not be repeated.

The FIG. 1B system differs from that of FIG. 1A in that a control signal V1 (asserted at the output of multiplier 214) is used to scale the control signal C1 (asserted at the output of limiter element 111) rather than the control signal S1 (asserted at the output of processor 134), and a control signal V2 (asserted at the output of multiplier 215) is used to scale the control signal C2 (asserted at the output of limiter element 112) rather than the control signal S2 (asserted at the output of processor 135). In FIG. 1B, scaling of raw ducking gain control signal C1 in response to sequence of attenuation control values V1 in accordance with the invention is performed by multiplying (in element 114) each raw gain control value of signal C1 by a corresponding one of the attenuation control values V1, to generate signal S3, and scaling of raw ducking gain control signal C2 in response to sequence of attenuation control values V2 in accordance with the invention is performed by multiplying (in element 115) each raw gain control value of signal C2 by a corresponding one of the attenuation control values V2, to generate signal S4.

To generate the sequence of attenuation control values V1, the signal Q (asserted at the output of processor 131) is asserted to an input of multiplier 214, and the control signal S1 (asserted at the output of processor 134) is asserted to the other input of multiplier 214. The output of multiplier 214 is the sequence of attenuation control values V1. Each of the attenuation control values V1 is one of the speech likelihood values determined by signal Q, scaled by a corresponding one of the attenuation control values S1.

Similarly, to generate the sequence of attenuation control values V2, the signal Q (asserted at the output of processor 131) is asserted to an input of multiplier 215, and the control signal S2 (asserted at the output of processor 135) is asserted to the other input of multiplier 215. The output of multiplier 215 is the sequence of attenuation control values V2. Each of the attenuation control values V2 is one of the speech likelihood values determined by signal Q, scaled by a corresponding one of the attenuation control values S2.

The FIG. 1B system (or that of FIG. 1A) can be implemented in software by a processor (e.g., processor 501 of FIG. 5) that has been programmed to implement the described operations of the FIG. 1B (or 1A) system. Alternatively, it can be implemented in hardware with circuit elements connected as shown in FIG. 1B (or 1A).

In variations on the FIG. 1B embodiment (or that of FIG. 1A), scaling of raw ducking gain control signal C1 in response to ducking gain control signal S1 (or V1) in accordance with the invention (to generate a ducking gain control signal for steering the amplifier 116) can be performed in a nonlinear manner. For example, such nonlinear scaling can generate a ducking gain control signal (replacing signal S3) that causes no ducking by amplifier 116 (i.e., application of unity gain by amplifier 116 and thus no attenuation of channel 103) when the current value of signal S1 (or V1) is below a threshold, and causes the current value of the ducking gain control signal (replacing signal S3) to equal the current value of signal C1 (so that signal S1 (or V1) does not modify the current value of C1) when the current value of signal S1 exceeds the threshold. Alternatively, other linear or nonlinear scaling of signal C1 (in response to the inventive ducking gain control signal S1 or V1) can be performed to generate a ducking gain control signal for steering the amplifier 116. For example, such scaling of signal C1 can generate a ducking gain control signal (replacing signal S3) that causes no ducking by amplifier 116 (i.e., application of unity gain by amplifier 116) when the current value of signal S1 (or V1) is below a threshold, and causes the current value of the ducking gain control signal (replacing signal S3) to equal the current value of signal C1 multiplied by the current value of signal S1 or V1 (or some other value determined from this product) when the current value of signal S1 (or V1) exceeds the threshold.

Similarly, in variations on the FIG. 1B embodiment (or that of FIG. 1A), scaling of raw ducking gain control signal C2 in response to ducking gain control signal S2 (or V2) in accordance with the invention (to generate a ducking gain control signal for steering the amplifier 117) can be performed in a nonlinear manner. For example, such nonlinear scaling can generate a ducking gain control signal (replacing signal S4) that causes no ducking by amplifier 117 (i.e., application of unity gain by amplifier 117 and thus no attenuation of channel 102) when the current value of signal S2 (or V2) is below a threshold, and causes the current value of the ducking gain control signal (replacing signal S4) to equal the current value of signal C2 (so that signal S2 or V2 does not modify the current value of C2) when the current value of signal S2 (or V2) exceeds the threshold. Alternatively, other linear or nonlinear scaling of signal C2 (in response to the inventive ducking gain control signal S2 or V2) can be performed to generate a ducking gain control signal for steering amplifier 117. For example, such scaling of signal C2 can generate a ducking gain control signal (replacing signal S4) that causes no ducking by amplifier 117 (i.e., application of unity gain by amplifier 117) when the current value of signal S2 (or V2) is below a threshold, and causes the current value of the ducking gain control signal (replacing signal S4) to equal the current value of signal C2 multiplied by the current value of signal S2 or V2 (or some other value determined from this product) when the current value of signal S2 (or V2) exceeds the threshold.

Another embodiment (225) of the inventive system will be described with reference to FIG. 2A. In response to a multi-channel audio signal comprising a speech channel 101 (center channel C) and two non-speech channels 102 and 103 (left and right channels L and R), the FIG. 2A system filters the non-speech channels to generate a filtered multichannel output audio signal comprising speech channel 101 and filtered non-speech channels 118 and 119 (filtered left and right channels L' and R').

Figure 2A:
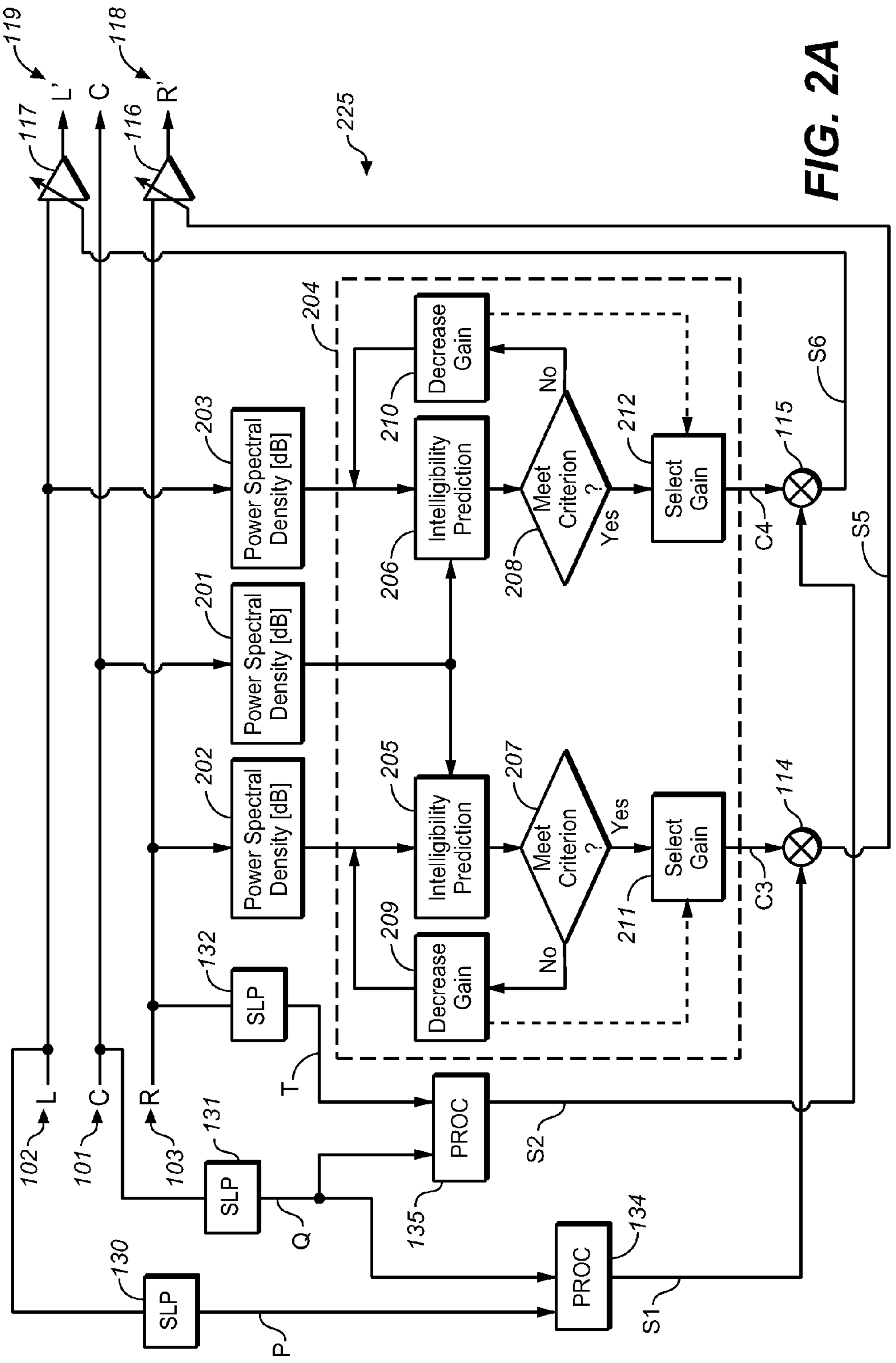
FIG. 2A is a block diagram of another embodiment of the inventive system.

In the FIG. 2A system (as in the FIG. 1A system), non-speech channels 102 and 103 are asserted to ducking amplifiers 117 and 116, respectively. In operation, ducking amplifier 117 is steered by a control signal S6 (which is indicative of a sequence of control values, and is thus also referred to as control value sequence S6) output from multiplication element 115, and ducking amplifier 116 is steered by control signal S5 (which is indicative of a sequence of control values, and is thus also referred to as control value sequence S5) output from multiplication element 114. Elements 114, 115, 130, 131, 132, 134, and 135 of FIG. 2A are identical to (and function identically as) the identically numbered elements of FIG. 1A, and the description of them above will not be repeated.

The FIG. 2A system measures the power of the signals in each of channels 101, 102, and 103 with a bank of power estimators, 201, 202, and 203. Unlike their counterparts in FIG. 1A, each of power estimators 201, 201, and 203 measures the distribution of the signal power across frequency (i.e., power in each different one of a set of frequency bands of the relevant channel), resulting in a power spectrum rather than a single number for each channel. The spectral resolution of each power spectrum ideally matches the spectral resolution of the intelligibility prediction models implemented by elements 205 and 206 (discussed below).

The power spectra are fed into comparison circuit 204. The purpose of circuit 204 is to determine the attenuation to be applied to each non-speech channel to ensure that the signal in the non-speech channel does not reduce the intelligibility of the signal in the speech channel to be less than a predetermined criterion. This functionality is achieved by employing an intelligibility prediction circuit (205 and 206) that predicts speech intelligibility from the power spectra of the speech channel signal (201) and non-speech channel signals (202 and 203). The intelligibility prediction circuits 205 and 206 may implement a suitable intelligibility prediction model according to design choices and tradeoffs. Examples are the Speech Intelligibility Index as specified in ANSI S3.5-1997 ("Methods for Calculation of the Speech Intelligibility Index") and the Speech Recognition Sensitivity model of Muesch and Buus ("Using statistical decision theory to predict speech intelligibility. I. Model structure" Journal of the Acoustical Society of America, 2001, Vol. 109, p 2896-2909). It is clear that the output of the intelligibility prediction model has no meaning when the signal in the speech channel is something other than speech. Despite this, in what follows the output of the intelligibility prediction model will be referred to as the predicted speech intelligibility. The perceived mistake is accounted for in subsequent processing by scaling the gain values output from the comparison circuit 204 with parameters S1 and S2, each of which is related to the likelihood of the signal in the speech channel being indicative of speech.

The intelligibility prediction models have in common that they predict either increased or unchanged speech intelligibility as the result of lowering the level of the non-speech signal. Continuing on in the process flow of FIG. 2A, the comparison circuits 207 and 208 compare the predicted intelligibility with a predetermined criterion value. If element 205 determines that the level of non-speech channel 103 is so low that the predicted intelligibility exceeds the criterion, a gain parameter, which is initialized to 0 dB, is retrieved from circuit 209 and provided to circuit 211 as the output C3 of comparison circuit 204. If element 206 determines that the level of non-speech channel 102 is so low that the predicted intelligibility exceeds the criterion, a gain parameter, which is initialized to 0 dB, is retrieved from circuit 210 and provided to circuit 212 as the output C4 of comparison circuit 204. If element 205 or 206 determines that the criterion is not met, the gain parameter (in the relevant one of elements 209 and 210) is decreased by a fixed amount and the intelligibility prediction is repeated. A suitable step size for decreasing the gain is 1 dB. The iteration as just described continues until the predicted intelligibility meets or exceeds the criterion value.

It is of course possible that the signal in the speech channel is such that the criterion intelligibility cannot be reached even in the absence of a signal in the non-speech channel. An example of such a situation is a speech signal of very low level or with severely restricted bandwidth. If that happens a point will be reached where any further reduction of the gain applied to the non-speech channel does not affect the predicted speech intelligibility and the criterion is never met. In such a condition, the loop formed by elements 205, 207, and 209 (or elements 206, 208, and 210) continues indefinitely, and additional logic (not shown) may be applied to break the loop. One particularly simple example of such logic is to count the number of iterations and exit the loop once a predetermined number of iterations has been exceeded.

Scaling of raw ducking gain control signal C3 in response to ducking gain control signal S1 in accordance with the invention can be performed by multiplying (in element 114) each raw gain control value of signal C3 by a corresponding one of the scaled averaged difference values of signal S1, to generate signal S5. Scaling of raw ducking gain control signal C4 in response to ducking gain control signal S2 in accordance with the invention can be performed by multiplying (in element 115) each raw gain control value of signal C4 by a corresponding one of the scaled averaged difference values of signal S2, to generate signal S6.

The FIG. 2A system can be implemented in software by a processor (e.g., processor 501 of FIG. 5) that has been programmed to implement the described operations of the FIG. 2A system. Alternatively, it can be implemented in hardware with circuit elements connected as shown in FIG. 2A.

In variations on the FIG. 2A embodiment, scaling of raw ducking gain control signal C3 in response to ducking gain control signal S1 in accordance with the invention (to generate a ducking gain control signal for steering the amplifier 116) can be performed in a nonlinear manner. For example, such nonlinear scaling can generate a ducking gain control signal (replacing signal S5) that causes no ducking by amplifier 116 (i.e., application of unity gain by amplifier 116 and thus no attenuation of channel 103) when the current value of signal S1 is below a threshold, and causes the current value of the ducking gain control signal (replacing signal S5) to equal the current value of signal C3 (so that signal S1 does not modify the current value of C3) when the current value of signal S1 exceeds the threshold. Alternatively, other linear or nonlinear scaling of signal C3 (in response to the inventive ducking gain control signal S1) can be performed to generate a ducking gain control signal for steering the amplifier 116. For example, such scaling of signal C3 can generate a ducking gain control signal (replacing signal S5) that causes no ducking by amplifier 116 (i.e., application of unity gain by amplifier 116) when the current value of signal S1 is below a threshold, and causes the current value of the ducking gain control signal (replacing signal S5) to equal the current value of signal C3 multiplied by the current value of signal S1 (or some other value determined from this product) when the current value of signal S1 exceeds the threshold.

Similarly, in variations on the FIG. 2A embodiment, scaling of raw ducking gain control signal C4 in response to ducking gain control signal S2 in accordance with the invention (to generate a ducking gain control signal for steering the amplifier 117) can be performed in a nonlinear manner. For example, such nonlinear scaling can generate a ducking gain control signal (replacing signal S6) that causes no ducking by amplifier 117 (i.e., application of unity gain by amplifier 117 and thus no attenuation of channel 102) when the current value of signal S2 is below a threshold, and causes the current value of the ducking gain control signal (replacing signal S6) to equal the current value of signal C4 (so that signal S2 does not modify the current value of C4) when the current value of signal S2 exceeds the threshold. Alternatively, other linear or nonlinear scaling of signal C4 (in response to the inventive ducking gain control signal S2) can be performed to generate a ducking gain control signal for steering amplifier 117. For example, such scaling of signal C4 can generate a ducking gain control signal (replacing signal S6) that causes no ducking by amplifier 117 (i.e., application of unity gain by amplifier 117) when the current value of signal S2 is below a threshold, and causes the current value of the ducking gain control signal (replacing signal S6) to equal the current value of signal C4 multiplied by the current value of signal S2 (or some other value determined from this product) when the current value of signal S2 exceeds the threshold.

Another embodiment (225') of the inventive system will be described with reference to FIG. 2B. In response to a multi-channel audio signal comprising a speech channel 101 (center channel C) and two non-speech channels 102 and 103 (left and right channels L and R), the system of FIG. 2B filters the non-speech channels to generate a filtered multi-channel output audio signal comprising speech channel 101 and filtered non-speech channels 118 and 119 (filtered left and right channels L' and R').

Figure 2B:
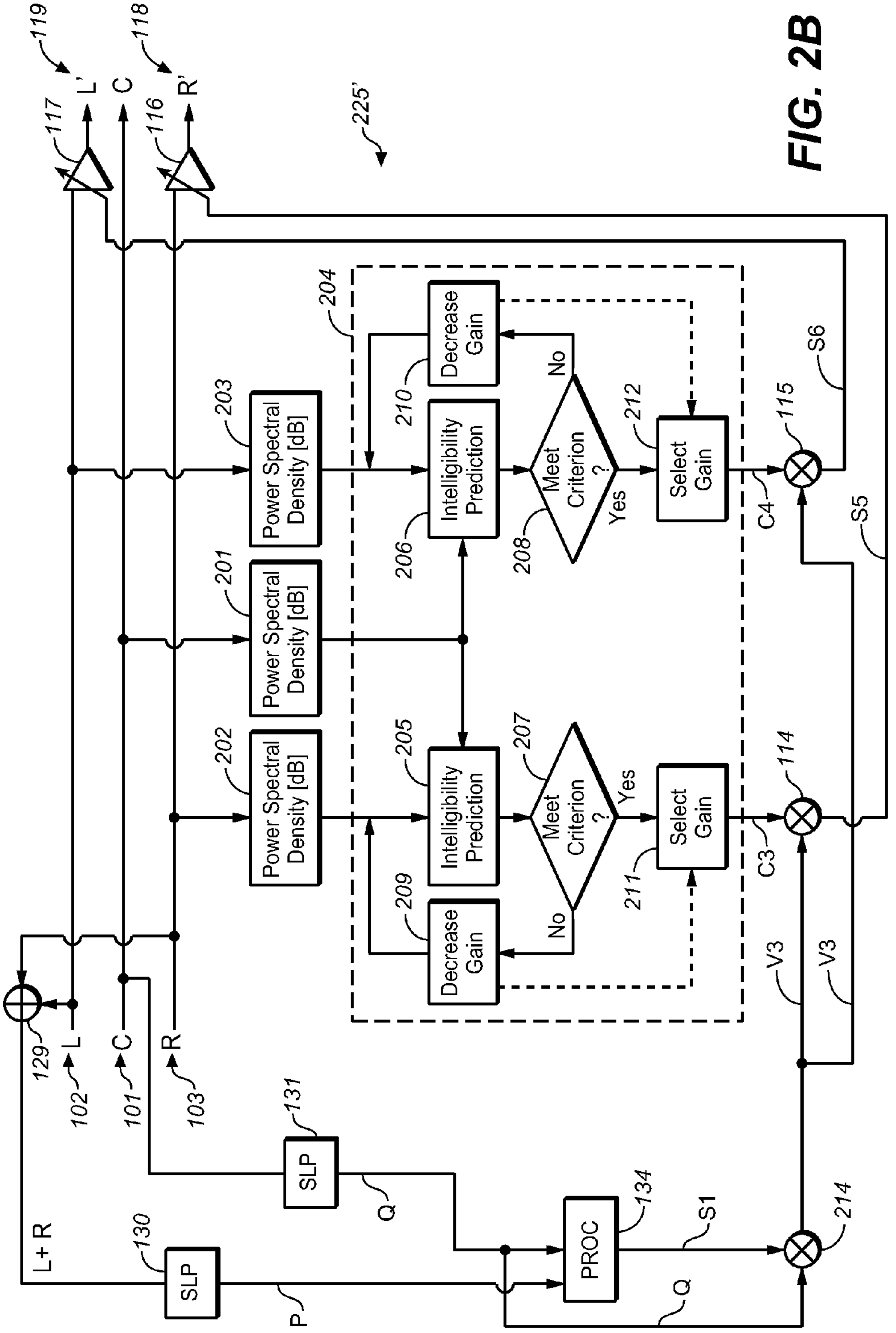
FIG. 2B is a block diagram of another embodiment of the inventive system.

In the system of FIG. 2B (as in the FIG. 2A system), non-speech channels 102 and 103 are asserted to ducking amplifiers 117 and 116, respectively. In operation, ducking amplifier 117 is steered by a control signal S6 (which is indicative of a sequence of control values, and is thus also referred to as control value sequence S6) output from multiplication element 115, and ducking amplifier 116 is steered by control signal S5 (which is indicative of a sequence of control values, and is thus also referred to as control value sequence S5) output from multiplication element 114. Elements 201, 202, 203, 204, 114, 115, 130, and 134 of FIG. 2B are identical to (and function identically as) the identically numbered elements of FIG. 2A, and the description of them above will not be repeated.

The FIG. 2B system differs from that of FIG. 2A in two major respects. First, the system is configured to generate (i.e., derive) a "derived" non-speech channel (L+R) from two individual non-speech channels (102 and 103) of the input audio signal, and to determine attenuation control values (V3) in response to this derived non-speech channel. In contrast, the FIG. 2A system determines attenuation control values S1 in response to one non-speech channel (channel 102) of the input audio signal and determines attenuation control values S2 in response to another non-speech channel (channel 103) of the input audio signal. In operation, the system of FIG. 2B attenuates each non-speech channel of the input audio signal (each of channels 102 and 103) in response to the same set of attenuation control values V3. In operation, the system of FIG. 2A attenuates non-speech channel 102 of the input audio signal in response to the attenuation control values S2, and attenuates non-speech channel 103 of the input audio signal in response to a different set of attenuation control values (values S1).

The system of FIG. 2B includes addition element 129 whose inputs are coupled to receive non-speech channels 102 and 103 of the input audio signal. The derived non-speech channel (L+R) is asserted at the output of element 129. Speech likelihood processing element 130 asserts speech likelihood signal P in response to derived non-speech channel L+R from element 129. In FIG. 2B, signal P is indicative of a sequence of speech likelihood values for the derived non-speech channel. Typically, speech likelihood signal P of FIG. 2B is a value monotonically related to the likelihood that the signal in the derived non-speech channel is speech. Speech likelihood signal Q (generated by processor 131) of FIG. 2B is identical to above-described speech likelihood signal Q of FIG. 2A.

A second major respect in which the FIG. 2B system differs from that of FIG. 2A is as follows. In FIG. 2B, the control signal V3 (asserted at the output of multiplier 214) is used (rather than the control signal S1 asserted at the output of processor 134) to scale raw ducking gain control signal C3 (asserted at the output of element 211), and the control signal V3 is also used (rather than the control signal S2 asserted at the output of processor 135 of FIG. 2A) to scale raw ducking gain control signal C4 (asserted at the output of element 212). In FIG. 2B, scaling of raw ducking gain control signal C3 in response to the sequence of attenuation control values indicated by signal V3 (to be referred to as attenuation control values V3) in accordance with the invention is performed by multiplying (in element 114) each raw gain control value of signal C3 by a corresponding one of the attenuation control values V3, to generate signal S5, and scaling of raw ducking gain control signal C4 in response to sequence of attenuation control values V3 in accordance with the invention is performed by multiplying (in element 115) each raw gain control value of signal C4 by a corresponding one of the attenuation control values V3, to generate signal S6.

In operation, the FIG. 2B system generates the sequence of attenuation control values V3 as follows. The speech likelihood signal Q (asserted at the output of processor 131 of FIG. 2B) is asserted to an input of multiplier 214, and the attenuation control signal S1 (asserted at the output of processor 134) is asserted to the other input of multiplier 214. The output of multiplier 214 is the sequence of attenuation control values V3. Each of the attenuation control values V3 is one of the speech likelihood values determined by signal Q, scaled by a corresponding one of the attenuation control values S1.

Another embodiment (325) of the inventive system will be described with reference to FIG. 3. In response to a multi-channel audio signal comprising a speech channel 101 (center channel C) and two non-speech channels 102 and 103 (left and right channels L and R), the FIG. 3 system filters the non-speech channels to generate a filtered multi-channel output audio signal comprising speech channel 101 and filtered non-speech channels 118 and 119 (filtered left and right channels L' and R').

Figure 3:
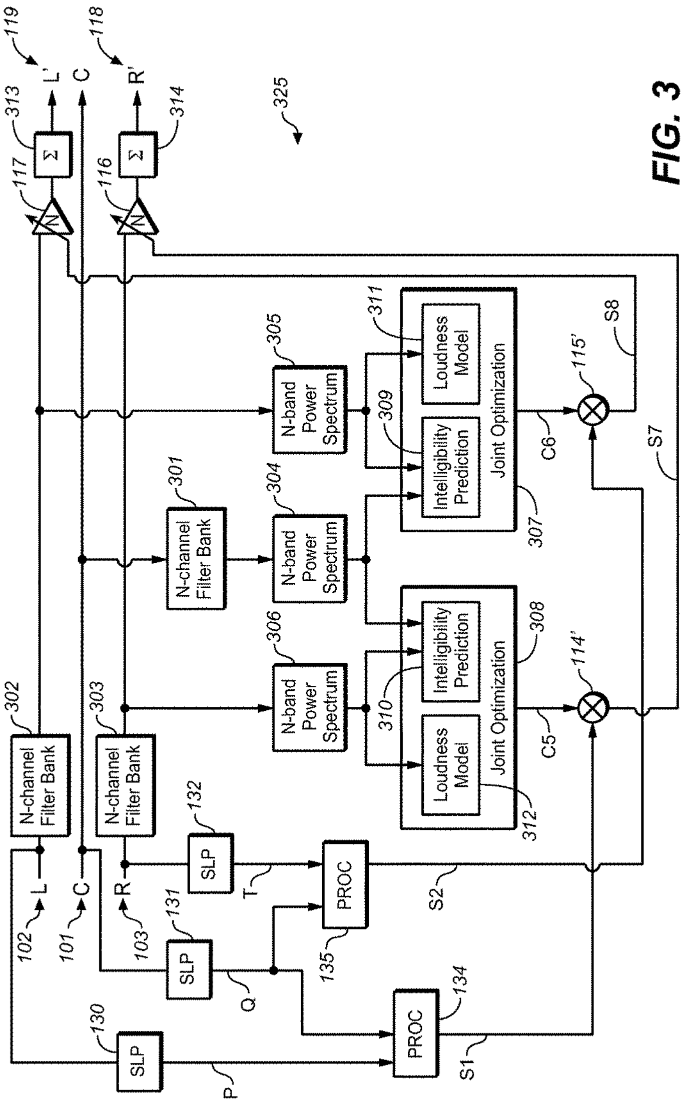
FIG. 3 is a block diagram of another embodiment of the inventive system.

In the FIG. 3 system, each of the signals in the three input channel is divided into its spectral components by filter bank 301 (for channel 101), filter bank 302 (for channel 102), and filter bank 303 (for channel 103). The spectral analysis may be achieved with time-domain N-channel filter banks. According to one embodiment, each filter bank partitions the frequency range into ⅓-octave bands or resembles the filtering presumed to occur in the human inner ear. The fact that the signal output from each filter bank consists of N sub-signals is illustrated by the use of heavy lines.

In the FIG. 3 system, the frequency components of the signals in non-speech channels 102 and 103 are asserted to ducking amplifiers 117 and 116, respectively. In operation, ducking amplifier 117 is steered by a control signal S8 (which is indicative of a sequence of control values, and is thus also referred to as control value sequence S8) output from multiplication element 115', and ducking amplifier 116 is steered by control signal S7 (which is indicative of a sequence of control values, and is thus also referred to as control value sequence S7) output from multiplication element 114'. Elements 130, 131, 132, 134, and 135 of FIG. 3 are identical to (and function identically as) the identically numbered elements of FIG. 1A, and the description of them above will not be repeated.

The process of FIG. 3 can be recognized as a side-branch process. Following the signal path shown in FIG. 3, the N sub-signals generated in bank 302 for non-speech channel 102 are each scaled by one member of a set of N gain values by ducking amplifier 117, and the N sub-signals generated in bank 303 for non-speech channel 103 are each scaled by one member of a set of N gain values by ducking amplifier 116. The derivation of these gain values will be described later. Next, the scaled sub-signals are recombined into a single audio signal. This may be done via simple summation (by summation circuit 313 for channel 102 and by summation circuit 314 for channel 103). Alternatively, a synthesis filter-bank that is matched to the analysis filter bank may be used. This process results in the modified non-speech signal R' (118) and the modified non-speech signal L' (119).

Describing now the side-branch path of the process of FIG. 3, each filter bank output is made available to a corresponding bank of N power estimators (304, 305, and 306). The resulting power spectra for channels 101 and 102 serve as inputs to an optimization circuit 307 that has as output an N-dimensional gain vector C6. The resulting power spectra for channels 101 and 103 serve as inputs to an optimization circuit 308 that has as output an N-dimensional gain vector C5. The optimization employs both an intelligibility prediction circuit (309 and 310) and a loudness calculation circuit (311 and 312) to find the gain vector that maximizes loudness of each non-speech channel while maintaining a predetermined level of predicted intelligibility of the speech signal in channel 101. Suitable models to predict intelligibility have been discussed with reference to FIG. 2A. The loudness calculation circuits 311 and 312 may implement a suitable loudness prediction model according to design choices and tradeoffs. Examples of suitable models are American National Standard ANSI S3.4-2007 "Procedure for the Computation of Loudness of Steady Sounds" and the German standard DIN 45631 "Berechnung des Lautstärkepegels and der Lautheit aus dem Geräuschspektrum".

Depending on the computational resources available and the constraints imposed, the form and complexity of the optimization circuits (307, 308) may vary greatly. According to one embodiment an iterative, multidimensional constrained optimization of N free parameters is used. Each parameter represents the gain applied to one of the frequency bands of the non-speech channel. Standard techniques, such as following the steepest gradient in the N-dimensional search space may be applied to find the maximum. In another embodiment, a computationally less demanding approach constrains the gain-vs.-frequency functions to be members of a small set of possible gain-vs.-frequency functions, such as a set of different spectral gradients or shelf filters. With this additional constraint the optimization problem can be reduced to a small number of one-dimensional optimizations. In yet another embodiment an exhaustive search is made over a very small set of possible gain functions. This latter approach might be particularly desirable in real-time applications where a constant computational load and search speed are desired.

Those of ordinary skill in the art will easily recognize additional constraints that might be imposed on the optimization according to additional embodiments of the present invention. One example is restricting the loudness of the modified non-speech channel to be not larger than the loudness before modification. Another example is imposing a limit on the gain differences between adjacent frequency bands in order to limit the potential for temporal aliasing in the reconstruction filter bank (313, 314) or to reduce the possibility for objectionable timbre modifications. Desirable constraints depend both on the technical implementation of the filter bank and on the chosen tradeoff between intelligibility improvement and timbre modification. For clarity of illustration, these constraints are omitted from FIG. 3.

Scaling of N-dimensional raw ducking gain control vector C6 in response to ducking gain control signal S2 in accordance with the invention can be performed by multiplying (in element 115') each raw gain control value of vector C6 by a corresponding one of the scaled averaged difference values of signal S2, to generate N-dimensional ducking gain control vector S8. Scaling of N-dimensional raw ducking gain control vector C5 in response to ducking gain control signal S1 in accordance with the invention can be performed by multiplying (in element 114') each raw gain control value of vector C5 by a corresponding one of the scaled averaged difference values of signal S1, to generate N-dimensional ducking gain control vector S7.

The FIG. 3 system can be implemented in software by a processor (e.g., processor 501 of FIG. 5) that has been programmed to implement the described operations of the FIG. 3 system. Alternatively, it can be implemented in hardware with circuit elements connected as shown in FIG. 3.

In variations on the FIG. 3 embodiment, scaling of raw ducking gain control vector C5 in response to ducking gain control signal S1 in accordance with the invention (to generate a ducking gain control vector for steering the amplifier 116) can be performed in a nonlinear manner. For example, such nonlinear scaling can generate a ducking gain control vector (replacing vector S7) that causes no ducking by amplifier 116 (i.e., application of unity gain by amplifier 116 and thus no attenuation of channel 103) when the current value of signal S1 is below a threshold, and causes the current values of the ducking gain control vector (replacing vector S7) to equal the current values of vector C5 (so that signal S1 does not modify the current values of C5) when the current value of signal S1 exceeds the threshold. Alternatively, other linear or nonlinear scaling of vector C5 (in response to the inventive ducking gain control signal S1) can be performed to generate a ducking gain control vector for steering the amplifier 116. For example, such scaling of vector C5 can generate a ducking gain control vector (replacing vector S7) that causes no ducking by amplifier 116 (i.e., application of unity gain by amplifier 116) when the current value of signal S1 is below a threshold, and causes the current value of the ducking gain control vector (replacing vector S7) to equal the current value of vector C5 multiplied by the current value of signal S1 (or some other value determined from this product) when the current value of signal S1 exceeds the threshold.

Similarly, in variations on the FIG. 3 embodiment, scaling of raw ducking gain control vector C6 in response to ducking gain control signal S2 in accordance with the invention (to generate a ducking gain control vector for steering the amplifier 117) can be performed in a nonlinear manner. For example, such nonlinear scaling can generate a ducking gain control vector (replacing vector S8) that causes no ducking by amplifier 117 (i.e., application of unity gain by amplifier 117 and thus no attenuation of channel 102) when the current value of signal S2 is below a threshold, and causes the current values of the ducking gain control vector (replacing vector S8) to equal the current values of vector C6 (so that signal S2 does not modify the current values of C6) when the current value of signal S2 exceeds the threshold. Alternatively, other linear or nonlinear scaling of vector C6 (in response to the inventive ducking gain control signal S2) can be performed to generate a ducking gain control vector for steering the amplifier 117. For example, such scaling of vector C6 can generate a ducking gain control vector (replacing vector S8) that causes no ducking by amplifier 117 (i.e., application of unity gain by amplifier 117) when the current value of signal S2 is below a threshold, and causes the current value of the ducking gain control vector (replacing vector S8) to equal the current value of vector C6 multiplied by the current value of signal S2 (or some other value determined from this product) when the current value of signal S2 exceeds the threshold.

It will be apparent to those of ordinary skill in the art from this disclosure how the FIG. 1A, 1B, 2A, 2B, or 3 system (and variations on any of them) can be modified to filter a multi-channel audio input signal having a speech channel and any number of non-speech channels. A ducking amplifier (or a software equivalent thereof) would be provided for each non-speech channel, and a ducking gain control signal would be generated (e.g., by scaling a raw ducking gain control signal) for steering each ducking amplifier (or software equivalent thereof).

As described, the system of FIG. 1A, 1B, 2A, 2B, or 3 (and each of many variations thereon) is operable to perform embodiments of the inventive method for filtering a multi-channel audio signal having a speech channel and at least one non-speech channel to improve intelligibility of speech determined by the signal. In a first class of such embodiments, the method includes steps of:

(a) determining at least one attenuation control value (e.g., signal S1 or S2 of FIG. 1A, 2A, or 3, or signal V1, V2, or V3 of FIG. 1B or 2B) indicative of a measure of similarity between speech-related content determined by the speech channel and speech-related content determined by at least one non-speech channel of the audio signal; and (b) attenuating at least one non-speech channel of the audio signal in response to the at least one attenuation control value (e.g., in element 114 and amplifier 116, or element 115 and amplifier 117, of FIG. 1A, 1B, 2A, 2B, or 3).

Typically, the attenuating step comprises scaling a raw attenuation control signal (e.g., ducking gain control signal C1 or C2 of FIG. 1A or 1B, or signal C3 or C4 of FIG. 2A or 2B) for the non-speech channel in response to the at least one attenuation control value. Preferably, the non-speech channel is attenuated so as to improve intelligibility of speech determined by the speech channel without undesirably attenuating speech-enhancing content determined by the non-speech channel. In some embodiments in the first class, step (a) includes a step of generating an attenuation control signal (e.g., signal S1 or S2 of FIG. 1A, 2A or 3, or signal V1, V2, or V3 of FIG. 1B or 2B) indicative of a sequence of attenuation control values, each of the attenuation control values indicative of a measure of similarity between speech-related content determined by the speech channel and speech-related content determined by at least one non-speech channel of the audio signal at a different time (e.g., in a different time interval), and step (b) includes steps of: scaling a ducking gain control signal (e.g., signal C1 or C2 of FIG. 1A or 1B, or signal C3 or C4 of FIG. 2A or 2B) in response to the attenuation control signal to generate a scaled gain control signal (e.g., signal S3 or S4 of FIG. 1A or 1B, or signal S5 or S6 of FIG. 2A or 2B), and applying the scaled gain control signal to attenuate the non-speech channel (e.g., asserting the scaled gain control signal to ducking circuitry 116 or 117, of FIG. 1A, 1B, 2A, or 2B, to control attenuation of at least one non-speech channel by the ducking circuitry). For example, in some such embodiments, step (a) includes a step of comparing a first speech-related feature sequence (e.g., signal Q of FIG. 1A or 2A) indicative of the speech-related content determined by the speech channel to a second speech-related feature sequence (e.g., signal P of FIG. 1A or 2A) indicative of the speech-related content determined by the non-speech channel to generate the attenuation control signal, and each of the attenuation control values indicated by the attenuation control signal is indicative of a measure of similarity between the first speech-related feature sequence and the second speech-related feature sequence at a different time (e.g., in a different time interval). In some embodiments, each attenuation control value is a gain control value.

In some embodiments in the first class, each attenuation control value is monotonically related to likelihood that the non-speech channel is indicative of speech-enhancing content that enhances the intelligibility (or another perceived quality) of speech content determined by the speech channel. In some other embodiments in the first class, each attenuation control value is monotonically related to an expected speech-enhancing value of the non-speech channel (e.g., a measure of probability that the non-speech channel is indicative of speech-enhancing content, multiplied by a measure of perceived quality enhancement that speech-enhancing content determined by the non-speech channel would provide to speech content determined by the multi-channel signal). For example, where step (a) includes a step of comparing (e.g., in element 134 or 135 of FIG. 1A or FIG. 2A) a first speech-related feature sequence indicative of speech-related content determined by the speech channel to a second speech-related feature sequence indicative of speech-related content determined by the non-speech channel, the first speech-related feature sequence may be a sequence of speech likelihood values, each indicating the likelihood at a different time (e.g., in a different time interval) that the speech channel is indicative of speech (rather than audio content other than speech), and the second speech-related feature sequence may also be a sequence of speech likelihood values, each indicating the likelihood at a different time (e.g., in a different time interval) that the non-speech channel is indicative of speech.

As described, the system of FIG. 1A, 1B, 2A, 2B, or 3 (and each of many variations thereon) is also operable to perform a second class of embodiments of the inventive method for filtering a multi-channel audio signal having a speech channel and at least one non-speech channel to improve intelligibility of speech determined by the signal. In the second class of embodiments, the method includes the steps of:

(a) comparing a characteristic of the speech channel and a characteristic of the non-speech channel to generate at least one attenuation value (e.g., values determined by signal C1 or C2 of FIG. 1A, or by signal C3 or C4 of FIG. 2A, or by signal C5 or C6 of FIG. 3) for controlling attenuation of the non-speech channel relative to the speech channel; and (b) adjusting the at least one attenuation value in response to at least one speech enhancement likelihood value (e.g., signal S1 or S2 of FIG. 1A, 2A, or 3) to generate at least one adjusted attenuation value (e.g., values determined signal S3 or S4 of FIG. 1A, or by signal S5 or S6 of FIG. 2A, or by signal S7 or S8 of FIG. 3) for controlling attenuation of the non-speech channel relative to the speech channel. Typically, the adjusting step is or includes scaling (e.g., in element 114 or 115 of FIG. 1A, 2A, or 3) each said attenuation value in response to one said speech enhancement likelihood value to generate one said adjusted attenuation value. Typically, each speech enhancement likelihood value is indicative of (e.g., monotonically related to) a likelihood that the non-speech channel is indicative of speech-enhancing content (content that enhances the intelligibility or other perceived quality of speech content determined by the speech channel). In some embodiments, the speech enhancement likelihood value is indicative of an expected speech-enhancing value of the non-speech channel (e.g., a measure of probability that the non-speech channel is indicative of speech-enhancing content multiplied by a measure of perceived quality enhancement that speech-enhancing content determined by the non-speech channel would provide to speech content determined by the multi-channel audio signal). In some embodiments in the second class, the speech enhancement likelihood value is a sequence of comparison values (e.g., difference values) determined by a method including a step of comparing a first speech-related feature sequence indicative of speech-related content determined by the speech channel to a second speech-related feature sequence indicative of speech-related content determined by the non-speech channel, and each of the comparison values is a measure of similarity between the first speech-related feature sequence and the second speech-related feature sequence at a different time (e.g., in a different time interval). In typical embodiments in the second class, the method also includes the step of attenuating the non-speech channel (e.g., in amplifier 116 or 117 of FIG. 1A, 2A, or 3) in response to the at least one adjusted attenuation value. Step (b) can comprise scaling the at least one attenuation value (e.g., each attenuation value determined by signal C1 or C2 of FIG. 1A), or another attenuation value determined by a ducking gain control signal or other raw attenuation control signal) in response to the at least one speech enhancement likelihood value (e.g., the corresponding value determined by signal S1 or S2 of FIG. 1A).

In operation of the FIG. 1A system to perform an embodiment in the second class, each attenuation value determined by signal C1 or C2 is a first factor indicative of an amount of attenuation of the non-speech channel necessary to limit the ratio of signal power in the non-speech channel to the signal power in the speech channel not to exceed a predetermined threshold, scaled by a second factor monotonically related to the likelihood of the speech channel being indicative of speech. Typically, the adjusting step in these embodiments is (or includes) scaling each attenuation value C1 or C2 by one speech enhancement likelihood value (determined by signal S1 or S2) to generate one adjusted attenuation value (determined by signal S3 or S4), where the speech enhancement likelihood value is a factor monotonically related to one of: a likelihood that the non-speech channel is indicative of speech-enhancing content (content that enhances the intelligibility or other perceived quality of speech content determined by the multi-channel signal), and an expected speech-enhancing value of the non-speech channel (e.g., a measure of probability that the non-speech channel is indicative of speech-enhancing content multiplied by a measure of the perceived quality enhancement that speech-enhancing content in the non-speech channel would provide to speech content determined by the multi-channel signal).

In operation of the FIG. 2A system to perform an embodiment in the second class, each attenuation value determined by signal C3 or C4 is a first factor indicative of an amount (e.g., the minimum amount) of attenuation of the non-speech channel sufficient to cause predicted intelligibility of speech determined by the speech channel in the presence of content determined by the non-speech channel to exceed a predetermined threshold value, scaled by a second factor monotonically related to the likelihood of the speech channel being indicative of speech. Preferably, the predicted intelligibility of speech determined by the speech channel in the presence of content determined by the non-speech channel is determined in accordance with a psycho-acoustically based intelligibility prediction model. Typically, the adjusting step in these embodiments is (or includes) scaling each said attenuation value by one said speech enhancement likelihood value (determined by signal S1 or S2) to generate one adjusted attenuation value (determined by signal S5 or S6), where the speech enhancement likelihood value is a factor monotonically related to one of: a likelihood that the non-speech channel is indicative of speech-enhancing content, and an expected speech-enhancing value of the non-speech channel.

In operation of the FIG. 3 system to perform an embodiment in the second class, each attenuation value determined by signal C1 or C2 is determined by steps including determining (in element 301, 302, or 303) a power spectrum indicative of power as a function of frequency, of each of speech channel 101 and non-speech channels 102 and 103, and performing a frequency-domain determination of the attenuation value, thereby determining attenuation as a function of frequency to be applied to frequency components of the non-speech channel.

In a class of embodiments, the invention is a method and system for enhancing speech determined by a multi-channel audio input signal. In some such embodiments, the inventive system includes an analysis module or subsystem (e.g., elements 130-135, 104-109, 114, and 115 of FIG. 1A, or elements 130-135, 201-204, 114, and 115 of FIG. 2A) configured to analyze the input multi-channel signal to generate attenuation control values, and an attenuation subsystem (e.g., amplifiers 116 and 117 of FIG. 1A or FIG. 2A). The attenuation subsystem includes ducking circuitry (steered by at least some of the attenuation control values) coupled and configured to apply attenuation (ducking) to each non-speech channel of the input signal to generate a filtered audio output signal. The ducking circuitry is steered by control values in the sense that the attenuation it applies to the non-speech channels is determined by current values of the control values.

In some embodiments, a ratio of speech channel (e.g., center channel) power to non-speech channel (e.g., side channel and/or rear channel) power is used to determine how much ducking (attenuation) should be applied to each non-speech channel. For example, in the FIG. 1A embodiment the gain applied by each of ducking amplifiers 116 and 117 is reduced in response to a decrease in a gain control value (output from element 114 or element 115) that is indicative of decreased power (within limits) of speech channel 101 relative to power of a non-speech channel (left channel 102 or right channel 103) determined in the analysis module (i.e., a ducking amplifier attenuates a non-speech channel by more relative to the speech channel when the speech channel power decreases (within limits) relative to the power of the non-speech channel) assuming no change in likelihood (as determined in the analysis module) that the non-speech channel includes speech-enhancing content that enhances speech content determined by the speech channel.

In some alternative embodiments, a modified version of the analysis module of FIG. 1A or FIG. 2A individually processes each of one or more frequency sub-bands of each channel of the input signal. Specifically, the signal in each channel may be passed through a bandpass filter bank, yielding three sets of n sub-bands: $\{L_1, L_2, \ldots, L_n\}$, $\{C_1, C_2, \ldots, C_n\}$, and $\{R_1, R_2, \ldots, R_n\}$. Matching sub-bands are passed to n instances of the analysis module of FIG. 1A (or FIG. 2A), and the filtered sub-signals (the outputs of the ducking amplifiers for the non-speech channels, and the non-filtered speech channel sub-signals) are recombined by summation circuits to generate the filtered multi-channel audio output signal. To perform on each sub-band the operations performed by element 109 of FIG. 1A, a separate threshold value $\vartheta_n$ (corresponding to threshold value $\vartheta$ of element 109) can be selected for each sub band. A good choice is a set in which $\vartheta_n$ is proportional to the average number of speech cues carried in the corresponding frequency region; i.e., bands at the extremes of the frequency spectrum are assigned lower thresholds than bands corresponding to dominant speech frequencies. This implementation of the invention can offer a very good tradeoff between computational complexity and performance.

Figure 4:
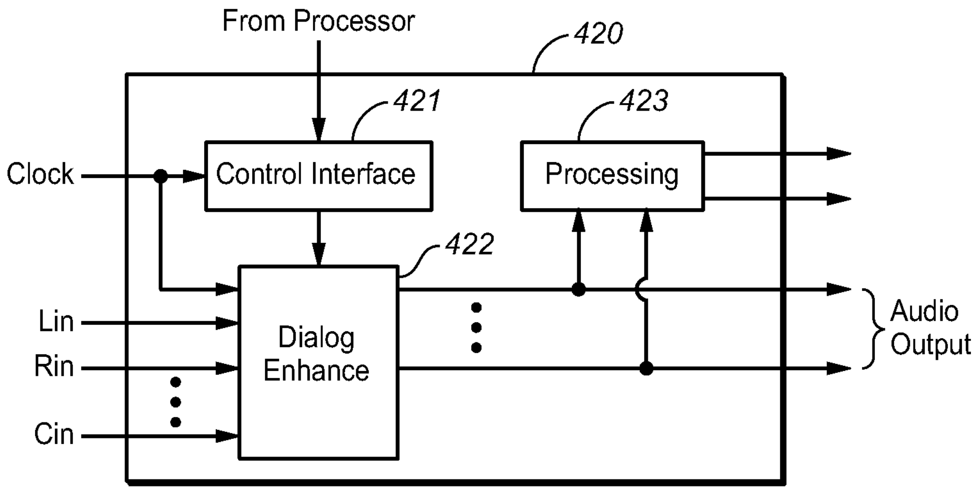
FIG. 4 is a block diagram of an audio digital signal processor (DSP) that is an embodiment of the inventive system.

FIG. 4 is a block diagram of a system 420 (a configurable audio DSP) that has been configured to perform an embodiment of the inventive method. System 420 includes programmable DSP circuitry 422 (an active speech enhancement module of system 420) coupled to receive a multi-channel audio input signal. For example, non-speech channels Lin and Rin of the signal can correspond to channels 102 and 103 of the input signal described with reference to FIGS. 1A, 1B, 2A, 2B, and 3, the signal can also include additional non-speech channels (e.g., left rear and right rear channels), and speech channel Cin of the signal can correspond to channel 101 of the input signal described with reference to FIGS. 1A, 1B, 2A, 2B, and 3. Circuitry 422 is configured in response to control data from control interface 421 to perform an embodiment of the inventive method, to generate a speech-enhanced multi-channel output audio signal in response to the audio input signal. To program system 420, appropriate software is asserted from an external processor to control interface 421, and interface 421 asserts in response appropriate control data to circuitry 422 to configure the circuitry 422 to perform the inventive method.

In operation, an audio DSP that has been configured to perform speech enhancement in accordance with the invention (e.g., system 420 of FIG. 4) is coupled to receive an N-channel audio input signal, and the DSP typically performs a variety of operations on the input audio (or a processed version thereof) in addition to (as well as) speech enhancement. For example, system 420 of FIG. 4 may be implemented to perform other operations (on the output of circuitry 422) in processing subsystem 423. In accordance with various embodiments of the invention, an audio DSP is operable to perform an embodiment of the inventive method after being configured (e.g., programmed) to generate an output audio signal in response to an input audio signal by performing the method on the input audio signal.

Figure 5:
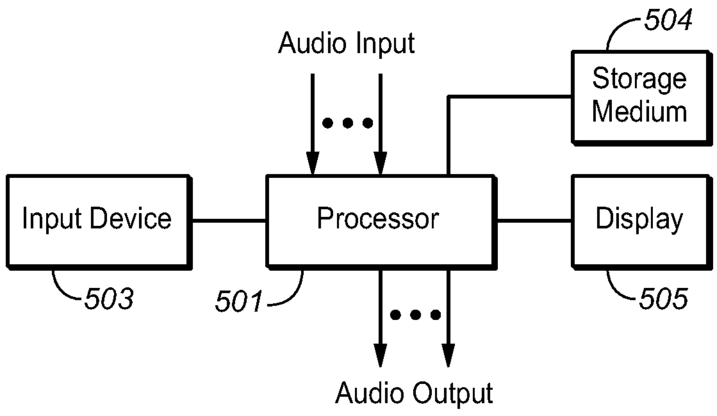
FIG. 5 is a block diagram of a computer system, including a computer readable storage medium 504 which stores computer code for programming the system to perform an embodiment of the inventive method.

In some embodiments, the inventive system is or includes a general purpose processor coupled to receive or to generate input data indicative of a multi-channel audio signal. The processor is programmed with software (or firmware) and/or otherwise configured (e.g., in response to control data) to perform any of a variety of operations on the input data, including an embodiment of the inventive method. The computer system of FIG. 5 is an example of such a system. The FIG. 5 system includes general purpose processor 501 which is programmed to perform any of a variety of operations on input data, including an embodiment of the inventive method.

The computer system of FIG. 5 also includes input device 503 (e.g., a mouse and/or a keyboard) coupled to processor 501, storage medium 504 coupled to processor 501, and display device 505 coupled to processor 501. Processor 501 is programmed to implement the inventive method in response to instructions and data entered by user manipulation of input device 503. Computer readable storage medium 504 (e.g., an optical disk or other tangible object) has computer code stored thereon that is suitable for programming processor 501 to perform an embodiment of the inventive method. In operation, processor 501 executes the computer code to process data indicative of a multi-channel audio input signal in accordance with the invention to generate output data indicative of a multi-channel audio output signal.

The system of above-described FIG. 1A, 1B, 2A, 2B, or 3 could be implemented in general purpose processor 501, with input signal channels 101, 102, and 103 being data indicative of center (speech) and left and right (non-speech) audio input channels (e.g., of a surround sound signal), and output signal channels 118 and 119 being output data indicative of speech-emphasized left and right audio output channels (e.g., of a speech-enhanced surround sound signal). A conventional digital-to-analog converter (DAC) could operate on the output data to generate analog versions of the output audio channel signals for reproduction by physical speakers.

Aspects of the invention are a computer system programmed to perform any embodiment of the inventive method, and a computer readable medium which stores computer-readable code for implementing any embodiment of the inventive method.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for filtering a multi-channel audio signal having a speech channel and at least one non-speech channel, to improve intelligibility of speech determined by the signal, said method including the steps of:

(a) determining at least one attenuation control value indicative of a measure of similarity between speech-related content determined by the speech channel and speech-related content determined by at least one non-speech channel of the multi-channel audio signal, where the attenuation control value is generated based on at least one speech enhancement likelihood value for the non-speech channel, and the speech enhancement likelihood value is indicative of a likelihood that said at least one non-speech channel is indicative of content that enhances perceived quality of speech content determined by the speech channel; and (b) attenuating at least one non-speech channel of the multi-channel audio signal in response to the at least one attenuation control value.

2. The method of claim 1, wherein each attenuation control value determined in step (a) is indicative of a measure of similarity between speech-related content determined by the speech channel and speech-related content determined by one non-speech channel of the audio signal, and step (b) includes a step of attenuating said non-speech channel in response to said each attenuation control value.

3. The method of claim 1, wherein step (a) includes a step of deriving a derived non-speech channel from the at least one non-speech channel of the audio signal, and the at least one attenuation control value is indicative of a measure of similarity between speech-related content determined by the speech channel and speech-related content determined by the derived non-speech channel.

4. The method of claim 3, wherein the derived non-speech channel is derived by combining a first non-speech channel of the multi-channel audio signal and a second non-speech channel of the multi-channel audio signal.

5. The method of claim 1, wherein step (b) comprises scaling a raw attenuation control signal for the non-speech channel in response to the at least one attenuation control value.

6. The method of claim 1, wherein step (a) includes the step of generating an attenuation control signal indicative of a sequence of attenuation control values, each of the attenuation control values indicative of a measure of similarity at a different time between speech-related content determined by the speech channel and speech-related content determined by the at least one non-speech channel of the multi-channel audio signal, and step (b) includes steps of:

scaling a ducking gain control signal in response to the attenuation control signal to generate a scaled gain control signal; and applying the scaled gain control signal to attenuate at least one non-speech channel of the multi-channel audio signal.

7. The method of claim 6, wherein step (a) includes a step of comparing a first speech-related feature sequence indicative of the speech-related content determined by the speech channel, to a second speech-related feature sequence indicative of the speech-related content determined by the at least one non-speech channel of the multi-channel audio signal to generate the attenuation control signal, and each of the attenuation control values indicated by the attenuation control signal is indicative of a measure of similarity at a different time between the first speech-related feature sequence and the second speech-related feature sequence.

8. The method of claim 1, wherein each said attenuation control value is monotonically related to likelihood that the at least one non-speech channel of the multi-channel audio signal is indicative of the content that enhances perceived quality of speech content determined by the speech channel.

9. A method for filtering a multi-channel audio signal having a speech channel and at least one non-speech channel, to improve intelligibility of speech determined by the signal, said method including the steps of:

(a) comparing a characteristic of the speech channel and a characteristic of the non-speech channel to generate at least one attenuation value for controlling attenuation of the non-speech channel relative to the speech channel, where the attenuation control value is generated based on at least one speech enhancement likelihood value for the non-speech channel, and the speech enhancement likelihood value is indicative of a likelihood that said at least one non-speech channel is indicative of content that enhances perceived quality of speech content determined by the speech channel; and (b) adjusting the at least one attenuation value in response to at least one speech enhancement likelihood value to generate at least one adjusted attenuation value for controlling attenuation of the non-speech channel relative to the speech channel.

10. The method of claim 9, wherein step (b) includes scaling each said attenuation value in response to one said speech enhancement likelihood value to generate one said adjusted attenuation value.

11. The method of claim 9, wherein each said speech enhancement likelihood value is monotonically related to likelihood that the non-speech channel is indicative of the content that enhances perceived quality of speech content determined by the speech channel.

12. The method of claim 9, wherein the at least one speech enhancement likelihood value is a sequence of comparison values, and the method includes a step of:

determining the sequence of comparison values by comparing a first speech-related feature sequence indicative of speech-related content determined by the speech channel to a second speech-related feature sequence indicative of speech-related content determined by the non-speech channel, wherein each of the comparison values is a measure of similarity at a different time between the first speech-related feature sequence and the second speech-related feature sequence.

13. The method of claim 9, also including the step of:

(c) attenuating the non-speech channel in response to the at least one adjusted attenuation value.

14. The method of claim 9, wherein each said attenuation value generated in step (a) is a first factor indicative of an amount of attenuation of the non-speech channel necessary to limit the ratio of signal power in the non-speech channel to the signal power in the speech channel not to exceed a predetermined threshold, scaled by a second factor monotonically related to the likelihood of the speech channel being indicative of speech.

15. The method of claim 9, wherein each said attenuation value generated in step (a) is a first factor indicative of an amount of attenuation of the non-speech channel sufficient to cause predicted intelligibility of speech determined by the speech channel in the presence of content determined by the non-speech channel to exceed a predetermined threshold value, scaled by a second factor monotonically related to the likelihood of the speech channel being indicative of speech.

16. The method of claim 9, wherein generation of each said attenuation value in step (a) includes steps of:

determining a power spectrum indicative of power as a function of frequency of the speech channel and a second power spectrum indicative of power as a function of frequency of the non-speech channel, and performing a frequency-domain determination of the attenuation value in response to the power spectrum and the second power spectrum.

17. A computer readable medium, which is a non-transitory medium on which is stored code for programming a processor to process data indicative of a multi-channel audio signal having a speech channel and at least one non-speech channel, to improve intelligibility of speech determined by the signal, including by:

(a) determining at least one attenuation control value indicative of a measure of similarity between speech-related content determined by the speech channel and speech-related content determined by the non-speech channel, where the attenuation control value is generated based on at least one speech enhancement likelihood value for the non-speech channel, and the speech enhancement likelihood value is indicative of a likelihood that said non-speech channel is indicative of content that enhances perceived quality of speech content determined by the speech channel; and (b) attenuating the non-speech channel in response to the at least one attenuation control value.

18. The computer readable medium of claim 17, on which is stored code for programming the processor to scale data indicative of a raw attenuation control signal for the non-speech channel in response to the at least one attenuation control value.

19. The computer readable medium of claim 18, on which is stored code for programming the processor:

to generate data indicative of a sequence of attenuation control values, each of the attenuation control values indicative of a measure of similarity at a different time between speech-related content determined by the speech channel and speech-related content determined by the non-speech channel; and to scale data indicative of a ducking gain control signal in response to the sequence attenuation control values to generate data indicative of a scaled gain control signal.

* * * * *